US010950002B2

(12) United States Patent
Oami et al.

(10) Patent No.: US 10,950,002 B2
(45) Date of Patent: *Mar. 16, 2021

(54) INFORMATION PROCESSING APPARATUS, CONTROL METHOD, AND PROGRAM

(71) Applicant: NEC Corporation, Tokyo (JP)

(72) Inventors: Ryoma Oami, Tokyo (JP); Katsuhiko Takahashi, Tokyo (JP); Yuusuke Konishi, Tokyo (JP); Hiroshi Yamada, Tokyo (JP); Hiroo Ikeda, Tokyo (JP); Junko Nakagawa, Tokyo (JP); Kosuke Yoshimi, Tokyo (JP); Ryo Kawai, Tokyo (JP); Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 328 days.

This patent is subject to a terminal disclaimer.

(21) Appl. No.: 16/065,530

(22) PCT Filed: Nov. 21, 2016

(86) PCT No.: PCT/JP2016/084406
§ 371 (c)(1),
(2) Date: Jun. 22, 2018

(87) PCT Pub. No.: WO2017/115587
PCT Pub. Date: Jul. 6, 2017

(65) Prior Publication Data
US 2020/0286259 A1    Sep. 10, 2020

(30) Foreign Application Priority Data
Dec. 28, 2015    (JP) .............................. JP2015-255924

(51) Int. Cl.
*H04N 7/18*    (2006.01)
*G06T 7/80*    (2017.01)
(Continued)

(52) U.S. Cl.
CPC ............ *G06T 7/80* (2017.01); *G02B 27/0172* (2013.01); *G06K 9/00362* (2013.01);
(Continued)

(58) Field of Classification Search
CPC .... G02B 2027/0132; G02B 2027/0138; G02B 2027/014; G02B 2027/0187;
(Continued)

(56) References Cited

U.S. PATENT DOCUMENTS 3,305,148 A  *  2/1967  Zimmerman ............. A45F 5/00
                                                224/255
8,786,680 B2 *  7/2014  Shiratori ................. G06F 3/011
                                                348/47
(Continued)

FOREIGN PATENT DOCUMENTS

| JP | 2001-211403 A | 8/2001 |
| JP | 2015-186021 A | 10/2015 |
| WO | 2004/077820 A1 | 9/2004 |

OTHER PUBLICATIONS

Jason Orlosky et al., Management and manipulation of text in dynamic mixed reality workspaces, 2013, IEEE, pp. 1-4.*

(Continued)

*Primary Examiner* — Gims S Philippe
(74) *Attorney, Agent, or Firm* — Sughrue Mion, PLLC

(57) ABSTRACT

An information processing apparatus (2000) includes a determination unit (2020) and a notification unit (2040). The determination unit (2020) determines whether a field of view of a second camera is correct, on the basis of a first captured image (40), a second captured image (50), and relationship information (information indicating the relationship to be satisfied between a field of view of a first camera and the field of view of the second camera). In a case in which the field of view of the second camera is not correct, the
(Continued)

notification unit (2040) notifies that the field of view of the second camera is not correct. The first camera is provided in a head-mounted display worn by a person. The second camera is provided in a part other than the head-mounted display.

13 Claims, 15 Drawing Sheets

(51) Int. Cl.
*H04N 5/232* (2006.01)
*G02B 27/01* (2006.01)
*G06K 9/00* (2006.01)
*G06T 7/00* (2017.01)
*H04N 5/225* (2006.01)
*H04N 5/247* (2006.01)

(52) U.S. Cl.
CPC ........ *G06K 9/00671* (2013.01); *G06T 7/0002* (2013.01); *H04N 5/2253* (2013.01); *H04N 5/23222* (2013.01); *H04N 5/23293* (2013.01); *H04N 5/247* (2013.01); *G02B 2027/014* (2013.01); *G02B 2027/0138* (2013.01); *G02B 2027/0178* (2013.01); *G06T 2207/30168* (2013.01); *G06T 2207/30196* (2013.01); *G06T 2207/30244* (2013.01)

(58) Field of Classification Search
CPC ... G02B 27/017; G02B 27/0172; G06F 1/163; G06F 3/011; G06F 3/013; G06T 19/006; G06T 2200/04; H04N 13/239; H04N 13/344; H04N 13/383
USPC ........................................................ 348/158
See application file for complete search history.

(56) References Cited

U.S. PATENT DOCUMENTS

| | | |
|---|---|---|
| 10,492,981 B1 | 12/2019 | Kumar |
| 10,641,603 B2 | 5/2020 | Abovitz et al. |
| 2006/0165395 A1 | 7/2006 | Shimano et al. |
| 2011/0063446 A1 | 3/2011 | McMordie et al. |
| 2012/0293395 A1 | 11/2012 | Williams |
| 2012/0327194 A1* | 12/2012 | Shiratori ................. G06F 3/011 348/47 |
| 2014/0160250 A1* | 6/2014 | Pomerantz ......... H04N 5/23219 348/47 |
| 2014/0180451 A1* | 6/2014 | Marty ................ G06K 9/00342 700/91 |
| 2015/0205126 A1* | 7/2015 | Schowengerdt ..... H04N 13/117 345/633 |
| 2015/0235447 A1 | 8/2015 | Abovitz et al. |
| 2015/0258431 A1* | 9/2015 | Stafford ................ A63F 13/211 463/31 |
| 2015/0271415 A1 | 9/2015 | Uemura et al. |
| 2016/0026253 A1 | 1/2016 | Bradski et al. |
| 2017/0257564 A1 | 9/2017 | Billinghurst et al. |
| 2019/0094981 A1 | 3/2019 | Bradski et al. |
| 2019/0253618 A1 | 8/2019 | Oami et al. |
| 2019/0253636 A1 | 8/2019 | Oami et al. |

OTHER PUBLICATIONS

International Search Report of PCT/JP2016/084406 dated Feb. 14, 2017.

Notice of Allowance dated Apr. 16, 2020, from the United States Patent and Trademark Office in U.S. Appl. No. 16/395,368.

Office Action dated Jul. 20, 2020, issued in U.S. Appl. No. 16/395,388.

\* cited by examiner

INFORMATION PROCESSING APPARATUS, CONTROL METHOD, AND PROGRAM

CROSS REFERENCE TO RELATED APPLICATIONS

This application is a National Stage of International Application No. PCT/JP2016/084406 filed Nov. 21, 2016, claiming priority based on Japanese Patent Application No. 2015-255924 filed Dec. 28, 2015, the content of which is incorporated herein by reference in its entirety.

TECHNICAL FIELD

The present invention relates to an information processing apparatus, a control method, and a program.

BACKGROUND ART

A body-worn camera that is mounted on, for example, the shoulder of a person has been used. For example, a security guard stands guard while wearing the body-worn camera. Therefore, the guard can remotely monitor a video captured by the body-worn camera or can analyze the video while standing guard in a spot.

A technique for making it easy to use a body-worn camera has been developed. For example, Patent Document 1 discloses a technique that easily adjusts the position of a glasses-type head-mounted display. The head-mounted display disclosed in Patent Document 1 is fixed to the head of the user by a fixing portion that presses both regions of the head of the user with appropriate force and an arm that extends from the frontal region of the head to the top of the head. A display corresponding to a lens portion of the glasses is connected to the arm by a rotating mechanism unit. The user can use the rotation mechanism unit to move up or down the display in a state in which the fixing portion and the arm are fixed to the head of the user.

The head-mounted display disclosed in Patent Document 1 is provided with three cameras. First, two cameras are provided at the sides of the display. In addition, one camera is provided at the top of the head of the arm.

As described above, since the display is movable, the display is moved to change the fields of view of the cameras provided in the display. In contrast, since the position of the camera provided at the top of the head is fixed, the field of view of the camera is fixed. Therefore, the head-mounted display disclosed in Patent Document 1 compares an image that is generated by the camera fixed to the top of the head with an image that is generated by the camera provided in the display to determine whether the display is located at a predetermined position.

RELATED DOCUMENT

Patent Document

[Patent Document 1] Japanese Patent Application Publication No. 2001-211403

SUMMARY OF THE INVENTION

Technical Problem

In some cases, for example, a guard wears a head-mounted display and has a separate camera mounted on the shoulder or the chest. For example, a camera provided in the head-mounted display is used to capture a scene in a wide range and the camera mounted on the shoulder is used to capture a close-up image of the face of a person.

Here, in a case in which the field of view of the camera mounted on, for example, the shoulder is not correct, the incorrect angle of view causes problems in monitoring or analyzing images. The premise of the technique disclosed in Patent Document 1 is that both the camera that is a reference for adjusting a position and the camera the position of which is to be adjusted are provided in the head-mounted display. Therefore, in the technique disclosed in Patent Document 1, it is difficult to determine whether the field of view of the camera mounted on, for example, the shoulder is correct.

The invention has been made in view of the above-mentioned problems. An object of the invention is to provide a technique that can recognize the shift of the field of view of a camera mounted on the body of a person.

Solution to Problem

An information processing apparatus according to the invention includes: 1) a determination unit that determines whether a field of view of a second camera worn by a person is correct, on the basis of a first captured image which is generated by a first camera worn by the person, a second captured image generated by the second camera, and relationship information indicating a predetermined relationship to be satisfied between a field of view of the first camera and the field of view of the second camera; and 2) a notification unit that, in a case in which the field of view of the second camera is determined to be incorrect, notifies that the field of view of the second camera is not correct. The first camera is provided in a head-mounted display worn by the person. The second camera is provided in a part other than the head-mounted display.

A control method according to the invention is performed by a computer. The control method includes: 1) a determination step of determining whether a field of view of a second camera worn by a person is correct, on the basis of a first captured image which is generated by a first camera worn by the person, a second captured image generated by the second camera, and relationship information indicating a predetermined relationship to be satisfied between a field of view of the first camera and the field of view of the second camera; and 2) a notification step of, in a case in which the field of view of the second camera is determined to be incorrect, notifying that the field of view of the second camera is not correct. The first camera is provided in a head-mounted display worn by the person. The second camera is provided in a part other than the head-mounted display.

A program according to the invention causes a computer to perform each step of the control method according to the invention and causes the computer to operate as the information processing apparatus according to the invention.

Advantageous Effects of Invention

The invention provides a technique that can recognize the shift of the field of view of a camera mounted on the body of a person.

BRIEF DESCRIPTION OF THE DRAWINGS

The above-mentioned object, other objects, features, and advantages of the invention will become apparent from the following preferred example embodiments and the following accompanying drawings.

DESCRIPTION OF EMBODIMENTS

Figure 1:
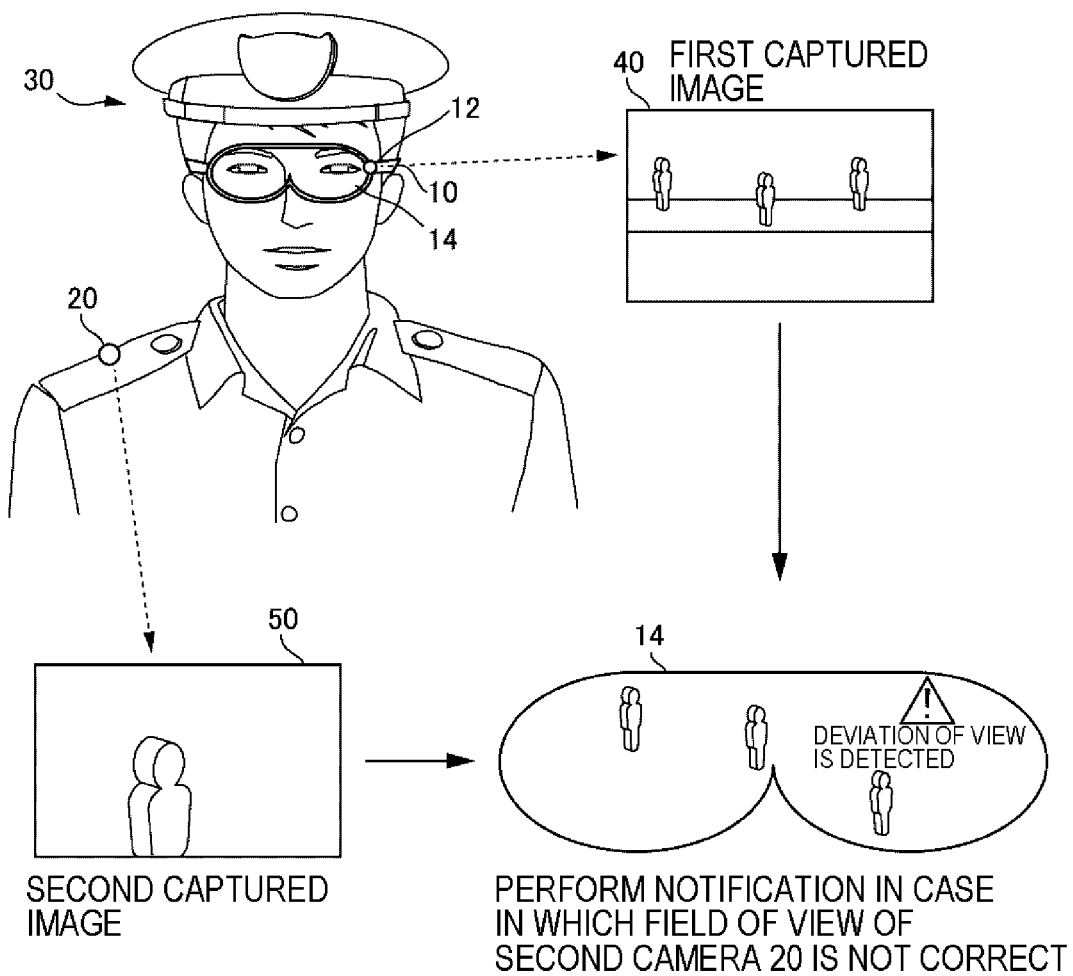
FIG. 1 is a conceptual diagram illustrating the operation of an information processing apparatus according to Example Embodiment 1.

Hereinafter, example embodiments of the invention will be described with reference to the drawings. However, in all of the drawings, the same components are denoted by the same reference numerals and the description thereof will not be repeated. In addition, in each block diagram except a diagram illustrating a hardware configuration, each block does not indicate a hardware unit, but indicates a functional unit.

Example Embodiment 1

FIG. 1 is a conceptual diagram illustrating the operation of an information processing apparatus 2000 according to Example Embodiment 1. A user 30 wears a head-mounted display 10. The user 30 is, for example, a security guard that guards an event site. The head-mounted display 10 includes a first camera 12 and a display device 14. The first camera 12 is a camera that captures an image of the surroundings. The display device 14 displays an arbitrary image. Since the head-mounted display 10 displays an arbitrary image on the display device 14, the user 30 can see a scene in which the arbitrary image is superimposed on surrounding scenery. For example, the head-mounted display 10 recognizes the surrounding scenery on the basis of a captured image generated by the first camera 12 and displays an augmented reality (AR) image on the display device 14 according to the surrounding scenery.

The user 30 also wears a second camera 20. The second camera 20 is a camera that captures an image of the surroundings and is mounted at an arbitrary position other than the head-mounted display 10. For example, the second camera 20 is a surveillance camera that generates a surveillance image for monitoring the surroundings of the user 30.

The information processing apparatus 2000 determines whether the field of view of the second camera 20 is correct. The information processing apparatus 2000 uses a first captured image 40 generated by the first camera 12 and a second captured image 50 generated by the second camera 20 for the determination. Here, the user 30 has two cameras, such as the first camera 12 and the second camera 20, mounted on the body. Therefore, for example, calibration is performed in advance to determine the relationship to be satisfied between the field of view of the first camera 12 and the field of view of the second camera 20. The information processing apparatus 2000 compares the first captured image 40 with the second captured image 50 to determine whether the relationship to be satisfied between the field of view of the first camera 12 and the field of view of the second camera 20 is satisfied. In a case in which the relationship is not satisfied, the information processing apparatus 2000 determines that the field of view of the second camera 20 is not correct.

Then, in a case in which the field of view of the second camera 20 is not correct, the information processing apparatus 2000 notifies that the field of view of the second camera 20 is not correct. The notification method may be an arbitrary method that is perceivable by the user 30.

Figure 2:
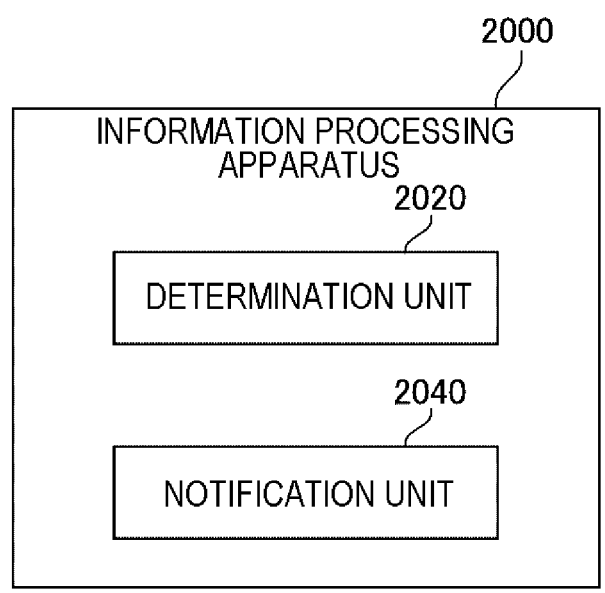
FIG. 2 is a block diagram illustrating the information processing apparatus according to Example Embodiment 1.

In order to achieve the above-mentioned function, the information processing apparatus 2000 includes a determination unit 2020 and a notification unit 2040. FIG. 2 is a block diagram illustrating the information processing apparatus 2000 according to Example Embodiment 1. The determination unit 2020 determines whether the field of view of the second camera 20 is correct on the basis of the first captured image 40, the second captured image 50, and relationship information. The relationship information is information indicating the relationship to be satisfied between the field of view of the first camera 12 and the field of view of the second camera 20. In a case in which the field of view of the second camera 20 is not correct, the notification unit 2040 notifies that the field of view of the second camera 20 is not correct.

Advantageous Effect

The information processing apparatus 2000 according to this example embodiment determines whether the field of view of the second camera 20 is correct, on the basis of the first captured image 40 generated by the first camera 12 that is provided in the head-mounted display 10 and the second captured image 50 generated by the second camera 20 that is mounted on a part of the user 30 other than the head-mounted display 10, and the relationship information indicating the relationship to be satisfied between the field of view of the first camera 12 and the field of view of the second camera 20. Then, the information processing apparatus 2000 notifies that the field of view of the second camera 20 is not correct.

According to this configuration, it is possible to determine whether the field of view of the second camera 20 provided in a part other than the head-mounted display 10 is correct.

Therefore, the user 30 can recognize the shift of the field of view of the second camera 20 provided in a part other than the head-mounted display 10. As a result, it is possible to easily correct the field of view of the second camera 20.

Next, the information processing apparatus 2000 according to this example embodiment will be described in more detail.

<Example of Hardware Configuration of Information Processing Apparatus 2000>

Each functional unit of the information processing apparatus 2000 may be implemented by hardware (for example, a hard-wired electronic circuit) that implements each function unit or a combination of hardware and software (for example, a combination of an electronic circuit and a program controlling the electronic circuit). Hereinafter, a case in which each functional unit of the information processing apparatus 2000 is implemented by a combination of hardware and software will be further described.

Figure 3:
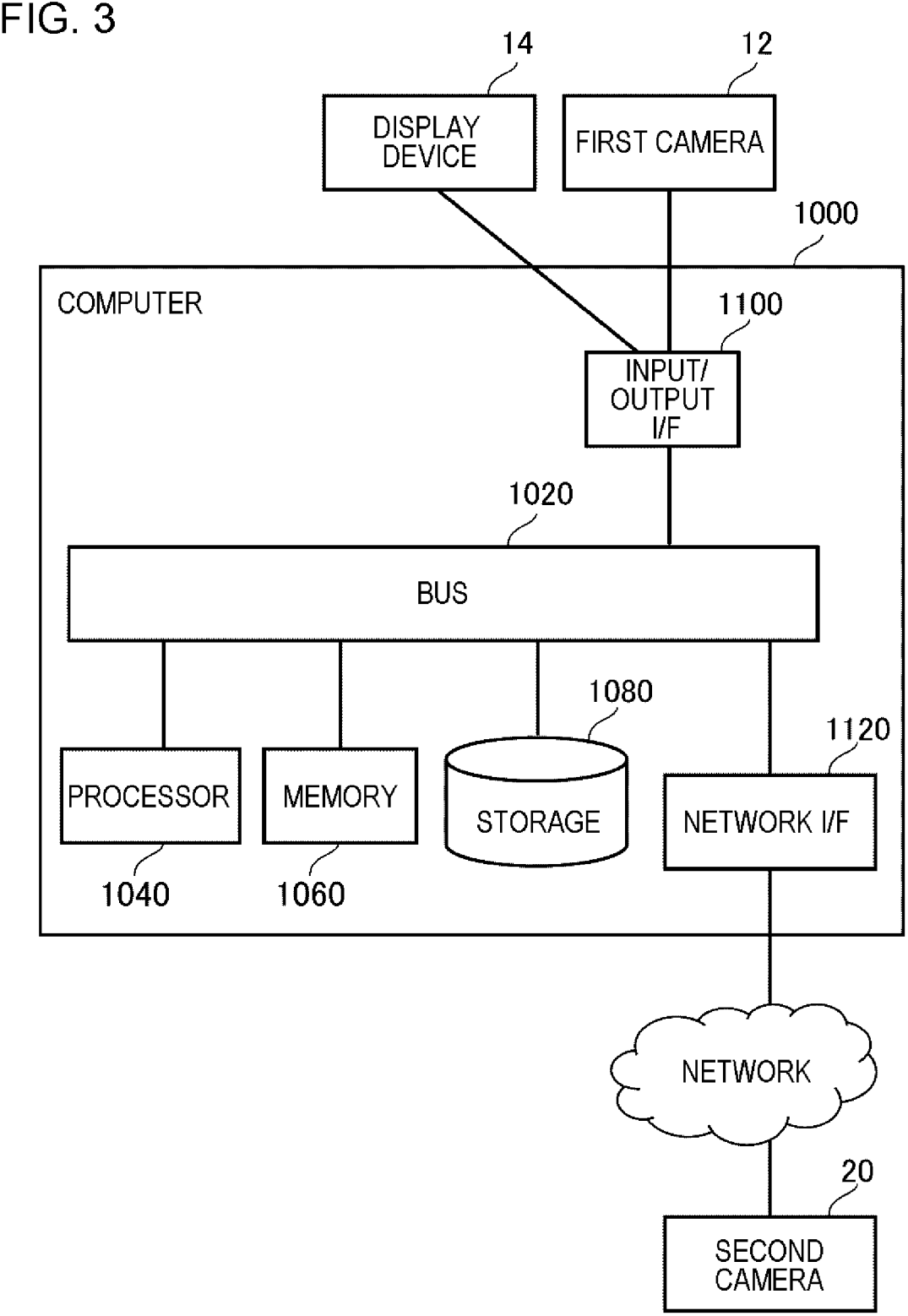
FIG. 3 is a diagram illustrating the configuration of a computer that implements the information processing apparatus.

FIG. 3 is a diagram illustrating the configuration of a computer 1000 that implements the information processing apparatus 2000. The computer 1000 is various types of computers, such as a personal computer (PC), a server apparatus, and a portable terminal. For example, the computer 1000 is provided as the head-mounted display 10. In addition, for example, the computer 1000 may be provided as the second camera 20.

The computer 1000 includes a bus 1020, a processor 1040, a memory 1060, a storage 1080, an input/output interface 1100, and a network interface 1120. The bus 1020 is a data transmission path through which the processor 1040, the memory 1060, the storage 1080, the input/output interface 1100, and the network interface 1120 transmit and receive data. However, a method for connecting, for example, the processor 1040 is not limited to bus connection. The processor 1040 is a processor such as a central processing unit (CPU) or a graphics processing unit (GPU). The memory 1060 is, for example, a random access memory (RAM) or a read only memory (ROM). The storage 1080 is a storage device such as a hard disk, a solid state drive (SSD), or a memory card. The storage 1080 may be a memory such as a RAM or a ROM.

The input/output interface 1100 is an interface for connecting the computer 1000 and an input/output device. For example, in a case in which the computer 1000 is provided as the head-mounted display 10, the first camera 12 or the display device 14 is connected to the input/output interface 1100.

The network interface 1120 is an interface for connecting the computer 1000 to a network. For example, in a case in which the computer 1000 is provided as the head-mounted display 10, the second camera 20 is connected to the network interface 1120. The computer 1000 acquires the second captured image 50 generated by the second camera 20 through the network.

The storage 1080 stores program modules that implement each function of the information processing apparatus 2000. The processor 1040 executes each program module to implement each function corresponding to the program modules. Here, in a case in which the processor 1040 executes each module, the processor 1040 may read the modules to the memory 1060 and execute the modules, or may execute the modules, without reading the modules to the memory 1060.

The hardware configuration of the computer 1000 is not limited to the configuration illustrated in FIG. 3. For example, each program module may be stored in the memory 1060. In this case, the computer 1000 may not include the storage 1080. In addition, for example, the second camera 20 may not be connected to the computer 1000 through the input/output interface 1100, but may be connected to the computer 1000 through the network interface 1120.

<<As to First Camera 12>>

The first camera 12 is a camera that is provided at an arbitrary position of the head-mounted display 10. The first camera 12 may be any camera that can capture an image of the surroundings of the head-mounted display 10. The first camera 12 repeatedly performs an imaging process and generates the first captured image 40 indicating the result of each imaging process.

<<As to Second Camera 20>>

The second camera 20 is a camera that is fixed to an arbitrary position (for example, the shoulder or the chest) of the user 30. The second camera 20 may be any camera that can capture an image of the surroundings of the second camera 20. For example, second camera 20 is a surveillance video camera. The second camera 20 repeatedly performs an imaging process and generates the second captured image 50 indicating each imaging result.

As described above, the computer 1000 may be implemented as the second camera 20. In this case, the second camera 20 compares the second captured image 50 generated by the second camera 20 with the first captured image 40 generated by the first camera 12 to determine whether the relationship to be satisfied between the field of view of the first camera 12 and the field of view of the second camera 20 is satisfied (the determination unit 2020). In a case in which the relationship is not satisfied, the second camera 20 notifies that the field of view of the second camera 20 is not correct (the notification unit 2040).

The second camera 20 that gives the functions of the information processing apparatus 2000 in this way may be a camera, such as an intelligent camera, a network camera, or an Internet protocol (IP) camera.

<Flow of Process>

Figure 4:
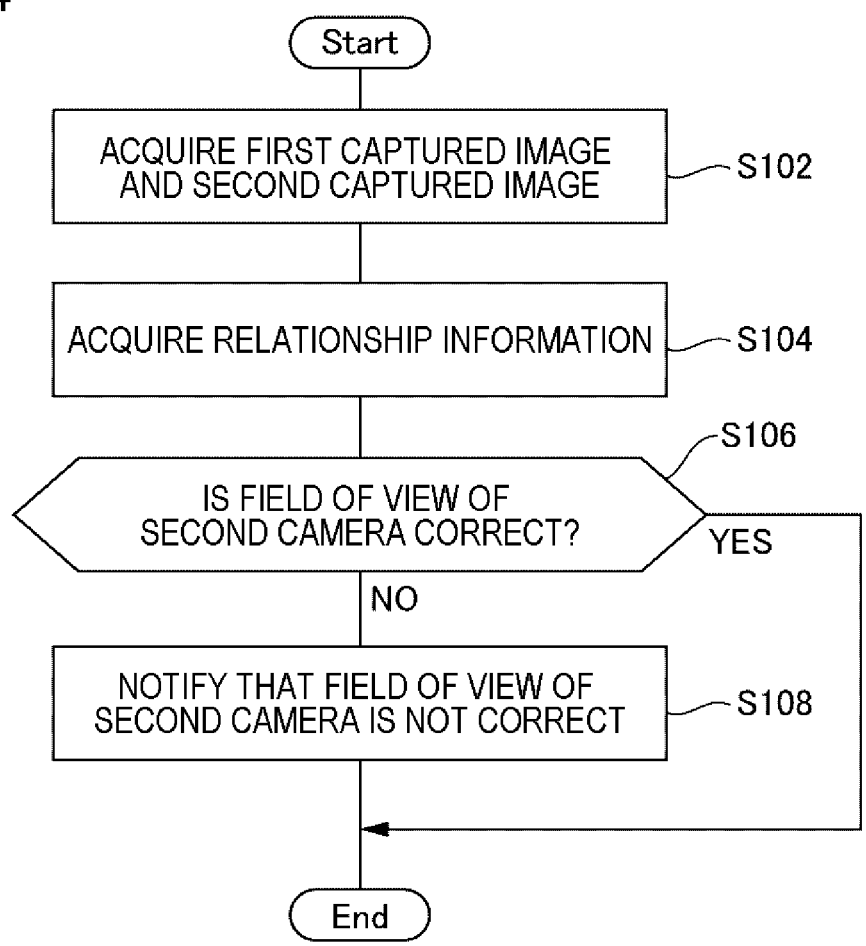
FIG. 4 is a flowchart illustrating the flow of a process performed by the information processing apparatus according to Example Embodiment 1.

FIG. 4 is a flowchart illustrating the flow of a process performed by the information processing apparatus 2000 according to Example Embodiment 1. The determination unit 2020 acquires the first captured image 40 and the second captured image 50 (S102). The determination unit 2020 acquires the relationship information (S104). The determination unit 2020 determines whether the field of view of the second camera 20 is correct on the basis of the first captured image 40, the second captured image 50, and the relationship information (S106). In a case in which the field of view of the second camera 20 is correct (S106: YES), the process illustrated in FIG. 4 ends. On the other hand, in a case in which the field of view of the second camera 20 is not correct (S106: NO), the process illustrated in FIG. 4 proceeds to S108. In S108, the notification unit 2040 performs notification (S110).

<Method for Acquiring First Captured Image 40>

The information processing apparatus 2000 acquires the first captured image 40 (S102). The information processing apparatus 2000 acquires the first captured image 40 using various methods. For example, the information processing apparatus 2000 acquires the first captured image 40 from the first camera 12. In this case, the information processing apparatus 2000 and the first camera 12 are connected such that they can communicate with each other.

In a case in which the first camera 12 stores the captured image in an external storage device, the information processing apparatus 2000 acquires the first captured image 40 from the storage device. In this case, the information processing apparatus 2000 and the storage device are connected such that they can communicate with each other.

The timing when the information processing apparatus 2000 acquires the first captured image 40 is not particularly limited. For example, the information processing apparatus 2000 acquires the generated first captured image 40 at the timing when the first captured image 40 is generated. In addition, for example, the information processing apparatus 2000 may periodically acquire the first captured image 40. In the latter case, the information processing apparatus 2000 may collectively acquire a plurality of first captured images 40.

<Method for Acquiring Second Captured Image 50>

The method used by the information processing apparatus 2000 to acquire the second captured image 50 and the timing when the information processing apparatus 2000 acquires the second captured image 50 are the same as the method used by the information processing apparatus 2000 to acquire the first captured image 40 and the timing when the information processing apparatus 2000 acquires the first captured image 40, respectively.

Note that, in a case in which the information processing apparatus 2000 is implemented as the second camera 20, the information processing apparatus 2000 acquires the second captured image 50 generated by the information processing apparatus 2000. In this case, the second captured image 50 is stored in, for example, the memory 1060 or the storage 1080 (see FIG. 3) provided in the information processing apparatus 2000.

<Details of Relationship Information>

The relationship information indicates the relationship to be satisfied between the field of view of the first camera 12 and the field of view of the second camera 20. Hereinafter, the relationship information will be described in detail.

<<Relationship Information 1>>

For example, the relationship to be satisfied between the field of view of the first camera 12 and the field of view of the second camera 20 is the relationship in which "the field of view of the second camera 20 includes a predetermined range of the field of view of the first camera 12". In this case, the relationship information includes information for specifying the predetermined range.

Figure 5:
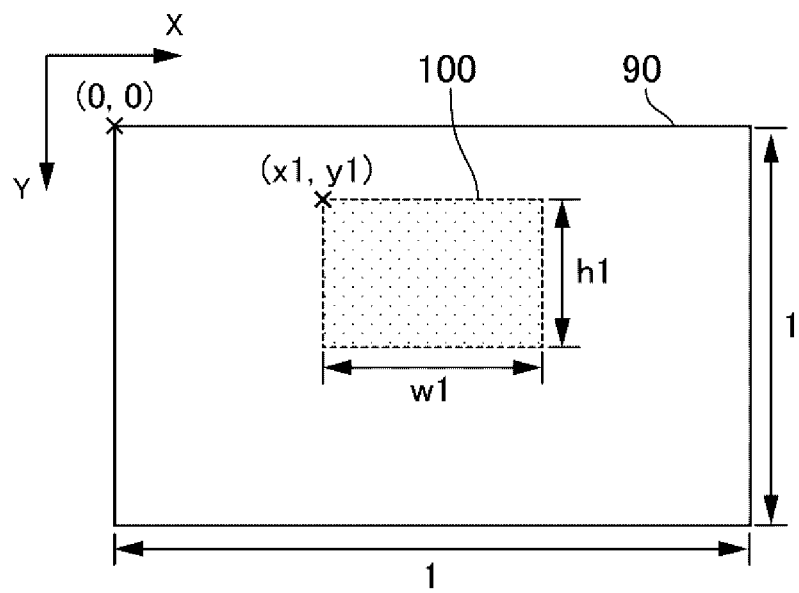
FIG. 5 is a first conceptual diagram illustrating relationship information.

FIG. 5 is a first conceptual diagram illustrating the relationship information. In FIG. 5, a field of view 90 indicates the field of view of the first camera 12. A predetermined range 100 indicates a range in the field of view of the first camera 12, the range having to be included in the field of view of the second camera 20. For example, the relationship information specifies the predetermined range 100 with "the coordinates of an upper end, a width, and a height". In FIG. 5, the coordinates of the upper end, width, and height of the predetermined range 100 are (x1, y1), w1, and h1, respectively. Here, in the coordinate system illustrated in FIG. 5, the origin is the upper left end of the field of view 90, the X direction is the right direction, and the Y direction is the downward direction. In addition, both the width and height of the predetermined range 100 are relative lengths in a case in which the width and height of the field of view 90 are 1.

Note that, for convenience, in the relationship information illustrated in FIG. 5, the size of the predetermined range 100 is represented by an absolute value. However, the value indicating the relationship information is not limited to the absolute value. For example, the relationship information may be configured such that the size of the predetermined range 100 is represented by the number of pixels. In addition, the X direction and the Y direction are not limited to the directions illustrated in FIG. 5. Any coordinate system can be used as long as it can describe the directions. However, in the following description, the same coordinate system as that illustrated in FIG. 5 is used.

The predetermined range 100 indicated by the relationship information may be fixedly set in advance or may be dynamically set. In the latter case, the predetermined range 100 may be manually set or may be set by an arbitrary computer (for example, the information processing apparatus 2000).

For example, the computer changes the position of the predetermined range 100 depending on the orientation of the face of the user 30. In a case in which the orientation of the face of the user 30 changes, the scenery in the first captured image 40 changes. In general, it is preferable to fixedly set the predetermined range 100 with respect to a specific region (for example, a region through which a person passes frequently) of the scenery in the first captured image 40 rather than to fixedly set the predetermined range 100 at a predetermined position on the first captured image 40. Therefore, the computer sets the position of the predetermined range 100 according to a change in the orientation of the face of the user 30.

For example, the computer performs matching between a plurality of first captured images 40 (frames forming a video generated by the first camera 12) to detect the movement of the entire scenery in the first captured image 40. Then, the computer shifts the position of the predetermined range 100 in a direction in which the movement is offset. For example, in a case in which it is detected that the entire scenery in the first captured image 40 has been moved by (dx, dy), the computer shifts the position of four corners of the predetermined range 100 from the current position by (−dx, −dy).

Here, as a method for performing the matching between the frames, various methods can be used. For example, the following methods can be used: a method that simply calculates an optical flow; and a method that extracts feature points and performs matching between the feature points.

<<Relationship Information 2>>

For example, the relationship to be satisfied between the field of view of the first camera 12 and the field of view of the second camera 20 is the relationship in which "the field of view of the second camera 20 includes a predetermined range of the field of view of the first camera 12 in the vertical direction or the horizontal direction of the field of view of the first camera 12". In this case, the relationship information includes information for specifying the predetermined range.

Figure 6:
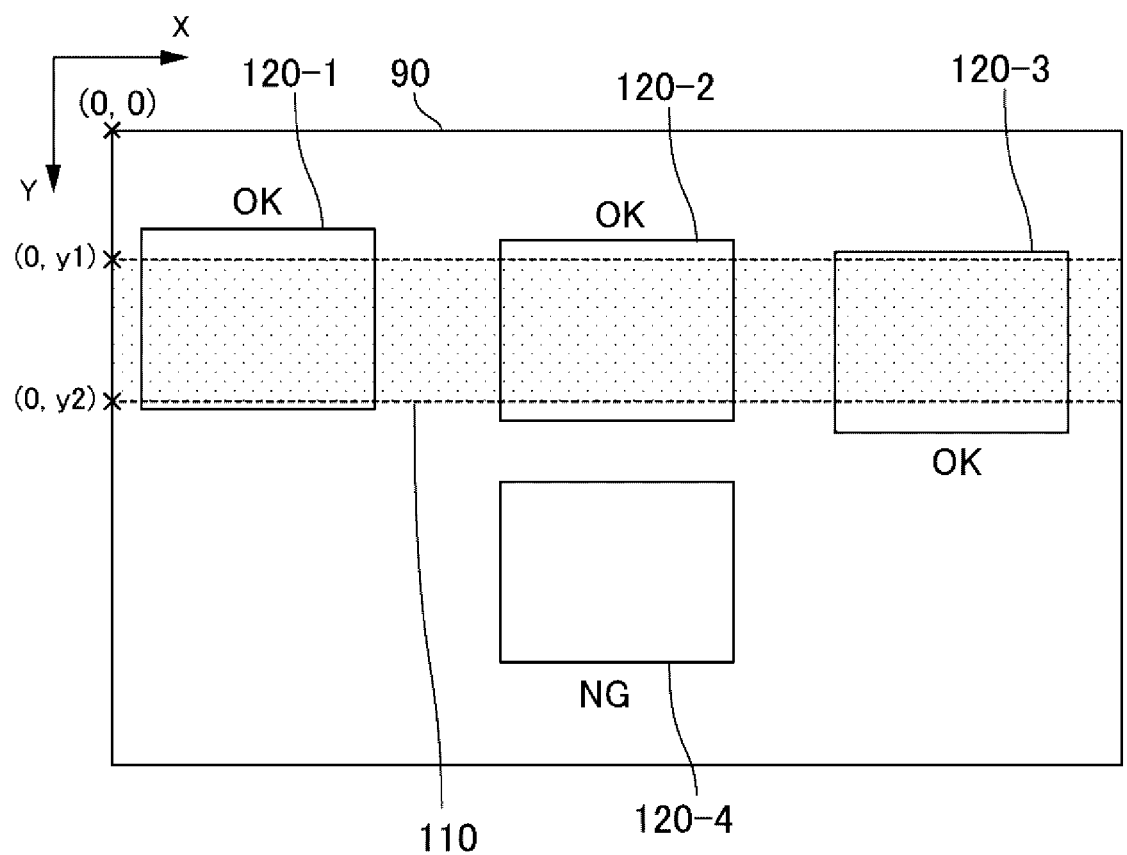
FIG. 6 is a second conceptual diagram illustrating relationship information.

FIG. 6 is a second conceptual diagram illustrating the relationship information. A field of view 120 indicates the field of view of the second camera 20. A predetermined range 110 indicates a range in the vertical direction of the field of view 90 of the first camera 12, the rage having to be included in the field of view 120 of the second camera 20. The conditions to be satisfied by the field of view 120 in the vertical direction are that the Y coordinate of the upper end of the field of view 120 is equal to or less than y1 and the Y coordinate of the lower end of the field of view 120 is equal to or greater than y2. In addition, the condition to be satisfied by the field of view 120 in the horizontal direction is that the field of view 120 is included in the field of view 90 of the first camera 12. In other words, the position of the field of view 120 in the horizontal direction may be any position included in the field of view 90.

In FIG. 6, four fields of view 120 of the second camera 20 are illustrated. All of a field of view 120-1, a field of view 120-2, and a field of view 120-3 satisfy the above-mentioned conditions. Therefore, in a case in which the field of view of the second camera 20 is any one of the fields of view 120-1 to 120-3, the determination unit 2020 determines that the field of view of the second camera 20 is correct. On the other hand, a field of view 120-4 does not satisfy the conditions in the vertical direction. Therefore, in a case in which the field of view of the second camera 20 is the field of view 120-4, the determination unit 2020 determines that the field of view of the second camera 20 is not correct.

For example, it is assumed that, while the first camera 12 is used to capture an image of an entire person, the second camera 20 is used to capture an enlarged image of a predetermined part (for example, the head) of the person. In this case, the field of view 120 of the second camera 20 needs to include a range that is assumed to include the predetermined part in the field of view 90 of the first camera 12. Therefore, for example, in the relationship information illustrated in FIG. 6, the predetermined range 110 indicates the range that is assumed to include the head of the person in the field of view 90 of the first camera 12.

Figure 7:
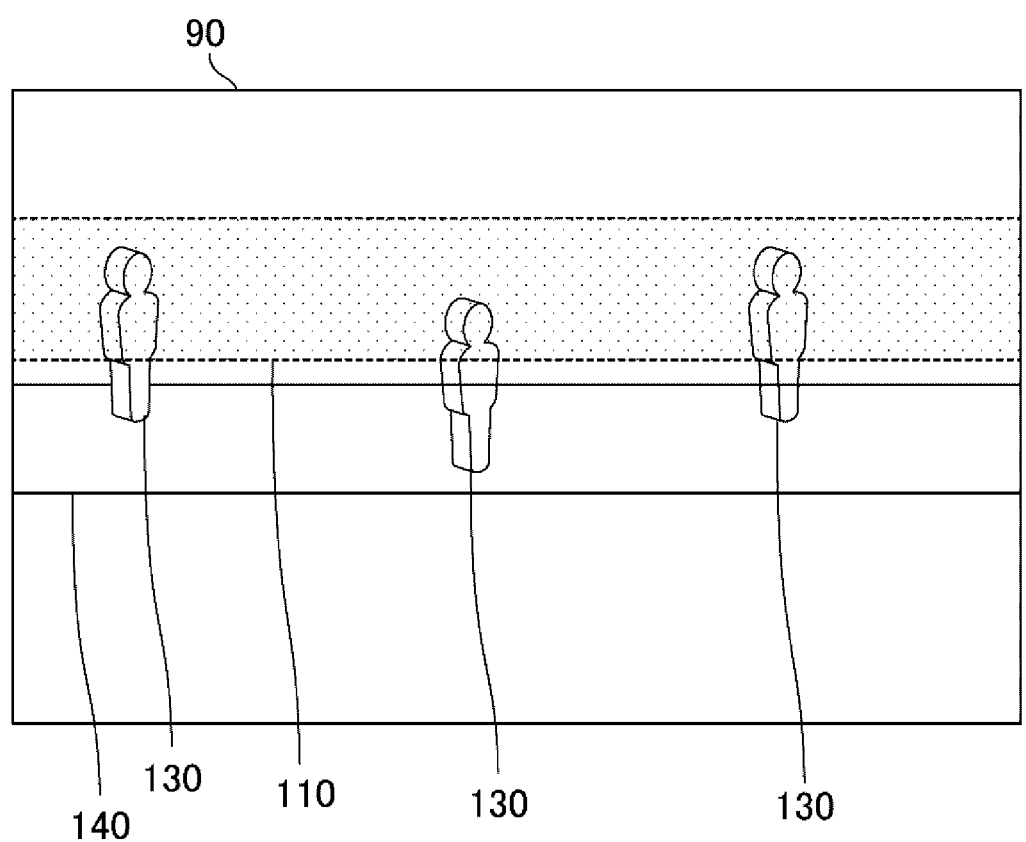
FIG. 7 is a diagram illustrating a case in which a portion in which the head of a person is assumed to be included is determined as a predetermined range.

FIG. 7 is a diagram illustrating a case in which a portion that is assumed to include the head of the person is determined as the predetermined range 110. In FIG. 7, the field of view 90 of the first camera 12 includes a scene in which a plurality of persons 130 walk on a street 140. All of the heads of the persons 130 are included in the predetermined range 110. Therefore, in a case in which the field of view 120 of the second camera 20 includes the predetermined range 110 in the vertical direction, the second captured image 50 includes the head of the person.

Note that, an example of the relationship information illustrated in FIG. 6 indicates the conditions of the field of view 120 of the second camera 20 in the vertical direction. However, the relationship information may indicate the conditions of the field of view 120 of the second camera 20 in the horizontal direction, using the same method as described above.

As described above, in a case in which the second camera 20 is used to capture an enlarged image of a predetermined part of a person, the relationship information may be information indicating the condition in which "in a case in which a person is included in the predetermined range 110 of the first camera 12, a predetermined part of the person is included in the field of view 120 of the second camera 20".

The predetermined range 110 indicated by the relationship information is set by various methods. In a case in which the position where the user 30 stands is fixed, for example, the first captured image 40 generated by the first camera 12 in a state in which the user 30 stands at a predetermined position is acquired in advance, and the first captured image 40 is used to set the predetermined range 110. The setting may be manually performed or may be performed by an arbitrary computer (for example, the information processing apparatus 2000).

In a case in which the predetermined range 110 is set by a computer, for example, the computer detects the head of the person included in the first captured image 40. Alternatively, instead of directly detecting the head, the computer may detect the upper half of the body and may use an upper part of the upper half as the head. Then, the computer sets the predetermined range 110 on the basis of the position of the detected head in the Y-axis direction.

For example, it is assumed that the height (y2−y1 in FIG. 6) of the predetermined range 110 is predetermined. In this case, the computer sets, as the predetermined range 110, a range which has the detected position of the head in the Y-axis direction as the center and has the predetermined height. In addition, for example, in a case in which information about belongings or clothes is desired to be acquired together with the head, the computer may set the predetermined range 110 such that the detected position of the head in the Y-axis direction is slightly above the center (has a value close to y1). In this case, for example, the computer sets the predetermined range 110 such that a point which internally divides an interval between y1 and y2 at a ratio of 1:α (α is a value greater than 1) is the center of the head.

For example, it is assumed that the heads of a plurality of persons are detected from the first captured image 40. In this case, for example, the computer sets the position (hereinafter, referred to as Ymin) of the head whose Y coordinate is the smallest as the upper end of the predetermined range 110, and sets the position (hereinafter, referred to as Ymax) of the head whose Y coordinate is the largest as the lower end of the predetermined range 110. Alternatively, the computer may set a margin of a predetermined width A and may set a range from Ymin−Δ to Ymax+Δ as the predetermined range 110. Information indicating the predetermined width A may be set in the computer in advance or may be stored in a storage device that can be accessed by the computer.

In a case in which the user 30 moves, in some cases, the range (predetermined range 110) in which the head of the person is assumed to be included in the field of view 90 of the first camera 12 is changed. In this case, the relationship information indicating the predetermined range 110 may be dynamically updated by an arbitrary computer (for example, the information processing apparatus 2000). For example, the computer periodically acquires the first captured image 40 and sets the predetermined range 110 on the basis of the position of the head of the person detected from the first captured image 40 as described above.

The dynamic update of the relationship information makes it possible to appropriately use the relationship information according to the movement of the user 30. Therefore, even in a case in which the user 30 moves, the information processing apparatus 2000 can appropriately determine whether the field of view of the second camera 20 becomes an intended field of view.

Note that, the relationship information may be information set in the determination unit 2020 or may be information stored in a storage device that can be accessed by the determination unit 2020.

<Details of Determination Unit 2020>

The determination unit 2020 determines whether the field of view of the second camera 20 is correct on the basis of the first captured image 40, the second captured image 50, and the relationship information (S106). Here, the scenery included in the first captured image 40 indicates scenery included in the field of view of the first camera 12. In contrast, the scenery included in the second captured image 50 indicates scenery included in the field of view of the second camera 20. The determination unit 2020 determines whether the field of view of the second camera 20 is correct on the basis of the field of view of the first camera 12 indicated by the first captured image 40, the field of view of the second camera 20 indicated by the second captured image 50, and the relationship information.

A specific method for determining whether the field of view of the second camera 20 is correct depends on what kind of information the relationship information indicates. Next, a specific method for determining whether the field of view of the second camera 20 is correct will be described.

<<Case 1>>

It is assumed that the relationship information indicates the relationship in which "the field of view of the second camera 20 includes a predetermined range of the field of view of the first camera 12" like the above-mentioned Relationship Information 1. In this case, the relationship information includes information for specifying the predetermined range 100 illustrated in FIG. 5.

The determination unit 2020 determines whether the scenery in the predetermined range 100 of the first captured image 40 is included in the scenery captured by the second camera 20. In a case in which the scenery in the predetermined range 100 of the first captured image 40 is included in the scenery captured by the second camera 20, the determination unit 2020 determines that the field of view of the second camera 20 is correct. On the other hand, in a case in which the scenery in the predetermined range 100 of the first captured image 40 is not included in the scenery captured by the second camera 20, the determination unit 2020 determines that the field of view of the second camera 20 is not correct.

Various methods are used to determine whether the scenery in the predetermined range 100 of the first captured image 40 is included in the scenery captured by the second camera 20. For example, the determination unit 2020 calculates a feature value of the predetermined range 100 of the first captured image 40 and a feature value of the second captured image 50. The feature value of the image is data indicating, for example, a characteristic color, pattern, or shape included in the image. In addition, the determination unit 2020 calculates the degree of matching between the feature values. For example, the determination unit 2020 calculates feature points of the first captured image 40 and the second captured image 50, extracts feature values in the vicinity of the feature points, and performs matching between the feature points to calculate the degree of matching between the feature values of the images.

In a case in which the matching is performed, when the magnification ratio of the first captured image 40 to the second captured image 50 is known, the determination unit 2020 can perform the matching at a high speed, using information indicating the magnification ratio. For example, it is assumed that the length of a certain object is L1 pixels in the first captured image 40 and is L2 pixels in the second captured image 50. In this case, the determination unit 2020 performs the matching between the second captured image scaled by L1/L2 and the first captured image. As such, in a case in which the matching is performed considering the magnification ratio, it is possible to perform the matching at a higher speed than that in a case in which the magnification ratio is not considered.

In a case in which the degree of matching between the features is equal to or greater than a predetermined value, the determination unit 2020 determines that the scenery in the predetermined range 100 of the first captured image 40 is included in the scenery in the second captured image 50. In this case, the determination unit 2020 determines that the field of view of the second camera 20 is correct. On the other hand, in a case in which the degree of matching between the features is less than the predetermined value, the determination unit 2020 determines that the scenery in the predetermined range 100 of the first captured image 40 is not included in the scenery in the second captured image 50. In this case, the determination unit 2020 determines that the field of view of the second camera 20 is not correct. Alternatively, the determination unit 2020 may perform the same determination process as described above for a case in which there exists a region in which the degree of matching between the feature values is equal to or greater than the predetermined value outside the predetermined range 100.

For example, the determination unit 2020 determines whether the scenery in the predetermined range 100 of the first captured image 40 is included in the scenery in the second captured image 50, on the basis of the degree of matching between the number of persons in the predetermined range 100 of the first captured image 40 and the number of persons in the second captured image 50. Specifically, first, the determination unit 2020 performs a person detection process for the predetermined range 100 of the first captured image 40 to detect the number of persons in the predetermined range 100. Similarly, the determination unit 2020 performs the person detection process for the second captured image 50 to detect the number of persons in the second captured image 50. Then, the determination unit 2020 calculates the degree of matching between the number of persons in the predetermined range 100 of the first captured image 40 and the number of persons in the second captured image 50. For example, the degree of matching is a value obtained by dividing the number of persons in the predetermined range 100 of the first captured image 40 by the number of persons in the second captured image 50.

In a case in which the degree of matching is equal to or greater than a predetermined value, the determination unit 2020 determines that the scenery in the predetermined range 100 of the first captured image 40 is included in the scenery in the second captured image 50. In this case, the determination unit 2020 determines that the field of view of the second camera 20 is correct. On the other hand, in a case in which the degree of matching is less than the predetermined value, the determination unit 2020 determines that the scenery in the predetermined range 100 of the first captured image 40 is not included in the scenery in the second captured image 50. In this case, the determination unit 2020 determines that the field of view of the second camera 20 is not correct. For example, it is required that the scenery in the first captured image 40 and the scenery in the second captured image 50 are matched with each other in a case in which the field of view of the second camera 20 is correct, the predetermined value is set to 1.

Note that, the person detection process for the first capture image 40 and that for the second capture image 50 are not necessarily the same as each other. The determination unit 2020 may be configured so as to perform an appropriate person detection process according to, for example, resolution. For example, the determination unit 2020 can use various methods, such as a method for detecting the entire person or a method for detecting only the upper half of the body, according to resolution.

As described above, in some cases, the second camera 20 is used to capture an enlarged image of a predetermined part (for example, the head) of the person. In this case, when the number of persons in the second captured image 50 is calculated, the determination unit 2020 may perform a process of detecting a predetermined part of a person for the second captured image 50 and may use the number of detected predetermined parts as the number of persons in the second captured image 50. For example, in a case in which the predetermined part is the head, the determination unit 2020 performs a head detection process or a face detection process.

In this way, the determination unit 2020 determines that the field of view of the second camera 20 is not correct in a case in which the degree of matching between the number of persons in the predetermined range 100 of the first captured image 40 and the number of predetermined parts of the persons in the second captured image 50 is less than a predetermined value. With this configuration, in a case in which a predetermined part of the person is not capable of being correctly captured in the field of view of the second camera 20, the user 30 can recognize the fact.

Note that, the information indicating which part of the person is the predetermined part may be set in the determination unit 2020 in advance or may be stored in a storage device that can be accessed by the determination unit 2020.

Note that, a method for determining whether a predetermined part of the person is included in the second captured image 50 is not limited to the method that performs the detection process of a predetermined part for the second captured image 50. For example, the determination unit 2020 may perform a process of detecting parts other than a predetermined part for the second captured image 50 and may determine whether the predetermined part is included in the second captured image 50 on the basis of the result of the process.

For example, it is assumed that the predetermined part is the head. In this case, when the feet of a person are included in the second captured image 50, the probability that the head of the person will be included in the second captured image 50 is low. Therefore, the determination unit 2020 performs a process of detecting the feet of a person for the second captured image 50. In a case in which the feet of the person are detected, the determination unit 2020 determines that the head, which is the predetermined part, is not included in the second captured image 50. On the other hand, in a case in which the feet of the person are not detected, the determination unit 2020 determines that the head, which is the predetermined part, is included in the second captured image 50.

In addition, the determination unit 2020 may determine whether the field of view of the second camera 20 is correct on the basis of the degree of matching between various objects in the predetermined range 100 of the first captured image 40 and various objects captured by the second camera 20. The object may or may not include a person. For example, the object is a road sign, a road cone, a tire of a vehicle, or a window frame of a house or a vehicle. Information indicating the type of object may be set in the determination unit 2020 in advance or may be stored in a storage device that can be accessed by the determination unit 2020.

Specifically, the determination unit 2020 performs an object detection process for the predetermined range 100 of the first captured image 40 and the entire second camera 20 to detect objects. Then, the determination unit 2020 calculates the degree of matching between an object in the predetermined range 100 of the first captured image 40 and an object captured by the second camera 20. For example, the degree of matching is a value indicating the proportion of the number of objects captured by the second camera 20 to the number of objects in the predetermined range 100 of the first captured image 40.

In a case in which the degree of matching is equal to or greater than a predetermined value, the determination unit 2020 determines that the scenery in the predetermined range 100 of the first captured image 40 is included in the scenery in the second captured image 50. In this case, the determination unit 2020 determines that the field of view of the second camera 20 is correct. On the other hand, in a case in which the degree of matching is less than the predetermined value, the determination unit 2020 determines that the scenery in the predetermined range 100 of the first captured image 40 is not included in the scenery in the second captured image 50. In this case, the determination unit 2020 determines that the field of view of the second camera 20 is not correct.

Alternatively, the determination unit 2020 may also use the positional relationship between the detected objects. For example, in a case in which a road cone detected from a lower portion of the predetermined range 100 in the first captured image 40 is detected from an upper portion of the second captured image 50 or in a case in which a sign detected from an upper portion of the predetermined range 100 in the first captured image 40 is detected from a lower portion of the second captured image 50, the determination unit 2020 determines that the field of view of the second camera 20 is not correct.

Alternatively, the determination unit 2020 may detect an object that is present outside the predetermined range 100 in the first captured image 40 and may determine whether the object outside the predetermined range 100 is included in the second captured image 50. In a case in which the object outside the predetermined range 100 is included in the second captured image 50, the determination unit 2020 determines that the field of view of the second camera 20 is not correct.

Note that, the timing when the determination unit 2020 determines whether the scenery in the predetermined range 100 of the first captured image 40 is not included in the scenery in the second captured image 50 is not particularly limited. For example, the determination unit 2020 performs the determination whenever the first captured image 40 and the second captured image 50 are acquired. In addition, for example, the determination unit 2020 periodically performs the determination process. Furthermore, for example, the determination unit 2020 may determine whether a person is included in the predetermined range 100 of the first captured image 40 and may determine whether the scenery in the predetermined range 100 of the first captured image 40 is included in the scenery in the second captured image 50 in a case in which a person is included in the predetermined range 100. Note that, the process of determining whether a person is included in the predetermined range 100 of the first captured image 40 may be performed whenever the first captured image 40 is acquired or periodically.

Alternatively, after determining whether the scenery in the predetermined range 100 of the first captured image 40 is included in the scenery in the second captured image 50 once, the determination unit 2020 may simplify the determination process. For example, after performing the determination process once, the determination unit 2020 may detect the amount of change in the scenery included in the first captured image 40 and may perform the determination process again in a case in which the amount of change is large.

The determination unit 2020 determines whether the amount of change in the scenery included in the first captured image 40 is large, using various methods. For example, the determination unit 2020 performs the determination process using an optical flow indicating the movement of the entire first captured image 40. Specifically, first, the determination unit 2020 calculates the optical flow. Then, in a case in which the average value of the optical flow is greater than a threshold value, the determination unit 2020 determines that the amount of change in the scenery included in the first captured image 40 is large.

For example, the determination unit 2020 may generate low-resolution images for each of a plurality of first captured images 40 and may perform the determination process using the low-resolution images. Specifically, the determination unit 2020 calculates a difference between the low-resolution images and determines that the amount of change in the scenery included in the first captured image 40 is large in a case in which the difference is equal to or greater than a predetermined value.

For example, the determination unit 2020 may extract background regions of each of a plurality of first captured images 40 and may determine that the amount of change in the scenery included in the first captured image 40 is large in a case in which the difference between the background regions is large. Here, the background region of the first captured image 40 is a region in which a person, which becomes a foreground region, is less likely included. A known technique can be used as a method for extracting the background region from the image.

For example, the determination unit 2020 may perform a compression process for a video (a video generated by the first camera 12) formed by a plurality of first captured images 40 and may determine that the amount of change in the scenery included in the first captured image 40 is large on the basis of the data size of the compressed video. In general, in a case in which a video is compressed, as the difference between frames increases, the data size of the compressed video increases. For this reason, for example, the determination unit 2020 divides the video generated by the first camera 12 into partial videos at a predetermined time interval and performs the compression process for each partial video. Then, the determination unit 2020 compares the data sizes of the partial videos. Then, in a case in which the difference between the data sizes of the partial videos is large, the determination unit 2020 determines that the amount of change in the scenery included in the first captured image 40 is large. Note that, various known compression methods can be used as the video compression process.

Note that, the determination unit 2020 may be configured to perform the determination multiple times and perform a final determination by integrating those results, instead of determining that the field of view of the second camera 20 is not correct based on a single determination alone. In some cases, when the user 30 temporarily changes the orientation of the face to look away, only the scenery in the first captured image 40 is greatly changed and the scenery in the second captured image 50 is little changed. In a case in which the user 30 only temporarily changes the orientation of the face, the user 30 eventually faces the same direction. Therefore, the scenery of the first captured image 40 eventually returns to the original position. In this case, it is considered that the field of view of the second camera 20 is correct. For this reason, the determination unit 2020 performs a plurality of determination processes and integrates the obtained results as described above. Therefore, for example, in a case in which the user 30 temporarily changes the orientation of the face, it is possible to prevent the field of view of the second camera 20 from being instantaneously determined to be incorrect.

Note that, the determination unit 2020 may be configured such that it performs the determination process using a combination of the above-mentioned various determination methods.

<Case 2>

It is assumed that the relationship information indicates the relationship in which "the field of view of the second camera 20 includes a predetermined range of the field of view of the first camera 12 in the vertical direction or the horizontal direction of the field of view of the first camera 12", like the above-mentioned Relationship Information 2.

In this case, the relationship information indicates information for specifying the predetermined range 110 illustrated in FIG. 6. In the example described with reference to FIG. 6, the field of view of the second camera 20 is a correct field of view as long as it includes the predetermined range 110 in the vertical direction.

Figure 8:
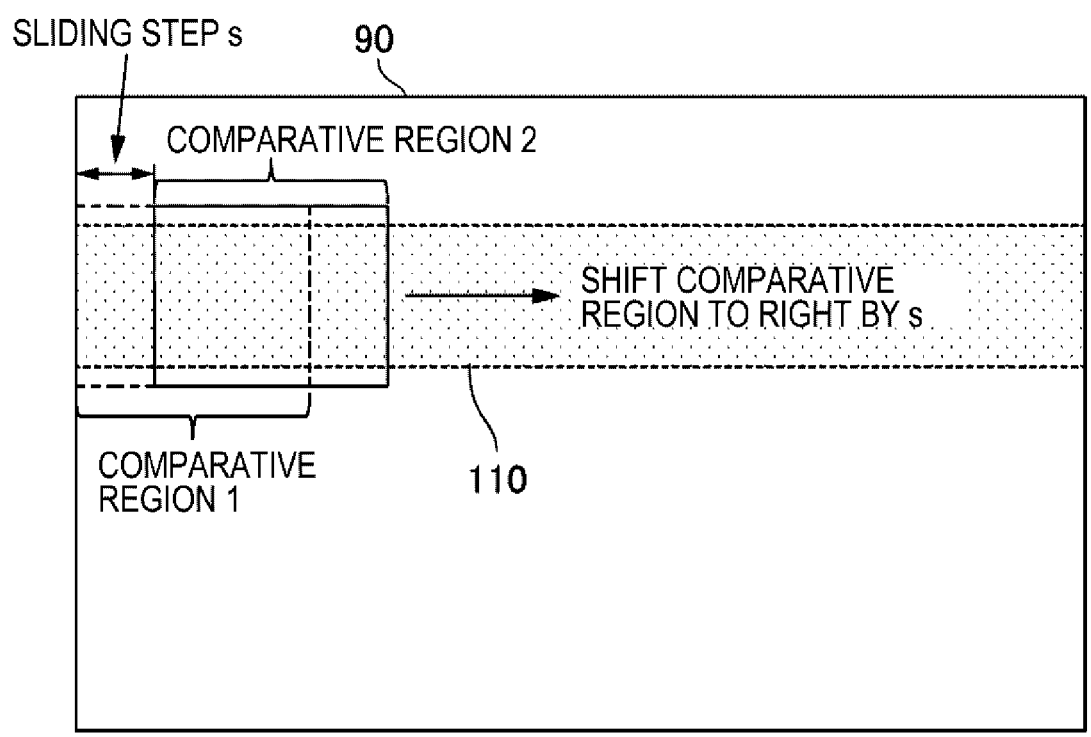
FIG. 8 is a conceptual diagram illustrating a determination method in Case 2.

For example, the determination unit 2020 determines whether the predetermined range 110 includes a region indicating the same scenery as that in the second captured image 50. An example of the comparison method will be described with reference to FIG. 8. FIG. 8 is a conceptual diagram illustrating a determination method according to Case 2. First, the determination unit 2020 extracts comparative region 1 from the first captured image 40. The comparative region 1 is defined as follows: 1) the comparative region 1 has the same size as the second captured image 50 or has a size that is a predetermined percentage less than the size of the second captured image 50; 2) the position of the left end of the comparative region 1 is aligned with the position of the left end of the first captured image 40; and 3) the position of the center of the comparative region 1 in the vertical direction is aligned with the position of the center of the predetermined range 110 in the vertical direction.

The determination unit 2020 compares scenery in the comparative region 1 of the first captured image 40 with the scenery in the second captured image 50. In a case in which the scenery in the comparative region 1 of the first captured image 40 is included in the scenery in the second captured image 50, the determination unit 2020 determines that the field of view of the second captured image 50 is correct. On the other hand, in a case in which the scenery in the comparative region 1 of the first captured image 40 is not included in the scenery in the second captured image 50, the determination unit 2020 extracts comparative region 2 which is the next comparison target from the first captured image 40. The comparative region 2 is obtained by shifting the comparative region 1 to the right by "s". Here, "s" is a predetermined sliding step. Then, the determination unit 2020 performs the same comparison process as that used for the comparative region 1 for the comparative region 2.

The determination unit 2020 repeats the above-mentioned comparison process while shifting the comparative region by "s" until the comparative region including the scenery in the second captured image 50 is found or until the comparative region reaches the right end of the first captured image 40. In a case in which the comparative region including the scenery in the second captured image 50 is not found even though the comparative region reaches the right end of the first captured image 40, the determination unit 2020 determines that the field of view of the second camera 20 is not correct.

Here, any of various methods described in Case 1 which determine whether the scenery in the predetermined range 100 of the first captured image 40 is included in the scenery in the second captured image 50 can be used as the method which determines whether the scenery in the comparative region of the first captured image 40 is included in the scenery in the second captured image 50.

Note that, the determination unit 2020 may determine the initial position (the left end in FIG. 8) of a comparative region compared with the second captured image 50 and a comparison order (from the left to the right in FIG. 8) on the basis of the results of the determination processes performed in the past (for example, the previous determination process). For example, the determination unit 2020 stores the position of the comparative region specified by the previous determination process and uses the position as the initial position of the comparative region. Then, the determination unit 2020 sequentially compares comparative regions, which are obtained by shifting the comparative region from the initial position to the left and the right by "s", with the second captured image 50. It is considered that the probability that scenery in the comparative region which has been matched in the previous process or a neighboring comparative region will be matched with the scenery in the second captured image 50 again is high. For this reason, in a case in which the initial position of the comparative region and the comparison order are determined on the basis of the result of the previous determination process, it is possible to increase the processing speed of the determination unit 2020.

In addition, in a case in which a whole movement of both the first captured image 40 and the second captured image 50 from the time when the previous determination process is performed is obtained, the determination unit 2020 may compensate for the movement and perform the same determination process as described above. For example, it is assumed that a comparative region including the same scenery as that in the second captured image 50 in the previous determination process is located at the position of x1 from the left end of the first captured image 40. It is assumed that the first captured image 40 to be subjected to the current determination process is shifted by "d", as compared to the first captured image 40 subjected to the previous determination process. In this case, the determination unit 2020 sets the initial position of the current comparative region to x1−d.

Note that, information indicating the sliding step s may be stored in the determination unit 2020 in advance or may be stored in a storage device that can be accessed by the determination unit 2020.

Note that, the timing when the determination unit 2020 performs the process of comparing the comparative region with the second captured image 50 is not particularly limited. For example, the determination unit 2020 performs the determination process whenever the first captured image 40 and the second captured image 50 are acquired. For example, the determination unit 2020 periodically performs the determination process. Note that, for example, the determination unit 2020 may determine whether a person is included in the predetermined range 110 of the first captured image 40 and may perform the comparison process in a case in which a person is included in the predetermined range 110. In addition, the process of determining whether a person is included in the predetermined range 110 of the first captured image 40 may be performed whenever the first captured image 40 is acquired or may be periodically performed. Alternatively, as described in Case 1, the movement of the entire screen may be detected and the determination process may be performed.

For example, in a case in which the road 140 illustrated in FIG. 7 is guarded, the field of view of the second camera 20 preferably includes the head of the person. Therefore, even in a case in which the field of view of the second camera 20 is changed from the original field of view in the horizontal direction, the change does not affect guarding. In addition, since the security guard stands guard while looking left and right, it is preferable that a change in the field of view of the second camera 20 for the horizontal direction is allowed.

According to the determination method in Case 2, in a case in which the field of view of the second camera 20 is changed from the original position in the horizontal direction, but is not changed in the vertical direction, the field of view of the second camera 20 is determined to be correct. Therefore, a change in the field of view of the second camera 20 can be allowed in the range in which, for example, guarding is not affected. As a result, the convenience of the second camera 20 is improved.

<<Case 3>>

It is assumed that the relationship information indicates the condition in which "in a case in which a person is included in a predetermined range of the field of view of the first camera 12, a predetermined part of the person is included in the field of view of the second camera 20". In this case, the relationship information includes information for specifying the predetermined range 110 illustrated in FIG. 6. In a case in which a person is included in the predetermined range 110 of the first captured image 40 and a predetermined part of the person is included in the second captured image 50, the determination unit 2020 determines that the field of view of the second camera 20 is not correct.

First, the determination unit 2020 performs an object analysis process for the predetermined range 110 of the first captured image 40 to determine whether a person is included in the predetermined range 110. In a case in which a person is included in the predetermined range 110, the determination unit 2020 detects a predetermined part of the person from the second captured image 50. In a case in which a predetermined part of the person is included in the second captured image 50, the determination unit 2020 determines that the field of view of the second camera 20 is correct. On the other hand, in a case in which a predetermined part of the person is not included in the second captured image 50, the determination unit 2020 determines that the field of view of the second camera 20 is not correct.

Figure 9A:
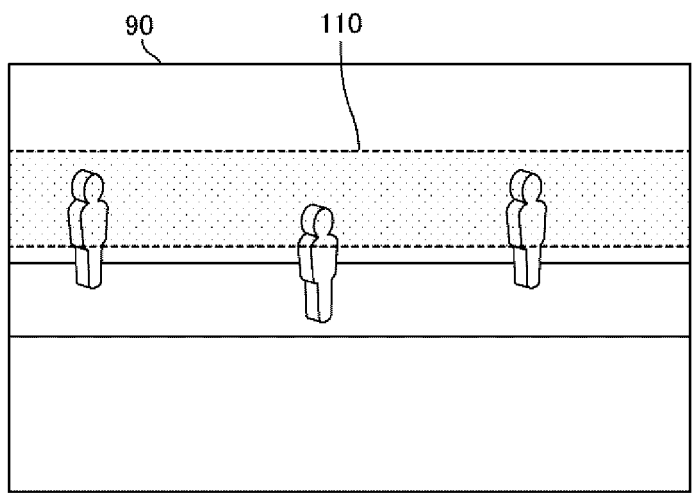
FIGS. 9A-9C are conceptual diagrams illustrating a determination method in Case 3.
Figure 9B:
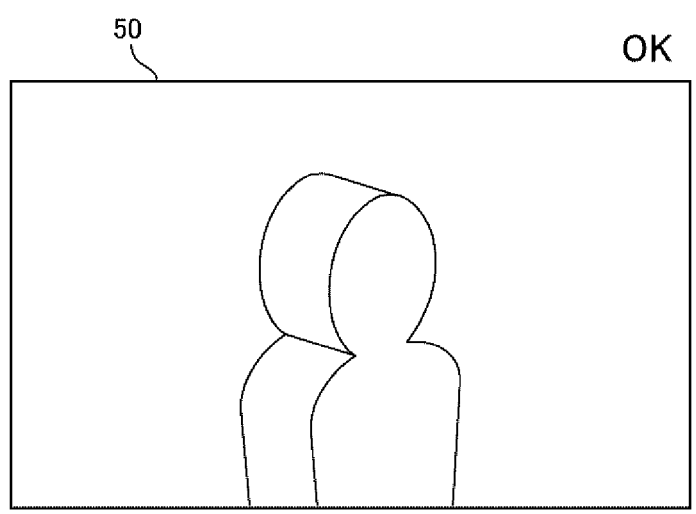
Figure 9C:
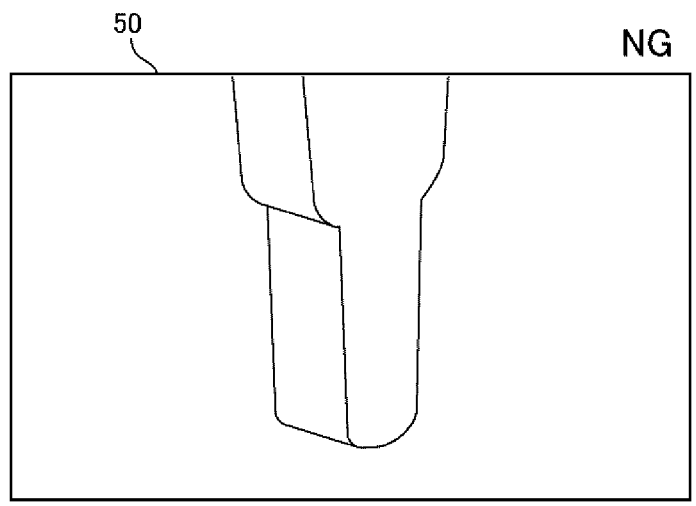

FIGS. 9A-9C are conceptual diagrams illustrating a determination method in Case 3. In this example, the predetermined part of the person is the head. FIG. 9A illustrates the first captured image 40. In FIG. 9A, the predetermined range 110 includes a person. The determination unit 2020 that has acquired the first captured image 40 determines whether the head of the person is included in the second captured image 50. In FIG. 9B, the second captured image 50 includes the head of the person. Therefore, the determination unit 2020 that has acquired the second captured image 50 determines that the field of view of the second camera 20 is correct. In contrast, in FIG. 9C, the second captured image 50 does not include the head of the person. Therefore, the determination unit 2020 that has acquired the second captured image 50 determines that the field of view of the second camera 20 is not correct.

Note that, as described above, the determination of whether a predetermined part of a person is included in the second captured image 50 may be performed on the basis of the result of the process of determining whether parts other than the predetermined part are included in the second captured image 50. Alternatively, the determination unit 2020 may be configured such that it recognizes an object in the background and performs the determination process. For example, in a case in which, for example, a road cone or a tire of a vehicle (particularly, in an upper region of the second captured image 50) is detected, the probability that the head of the person will be included in the second captured image 50 is low. Therefore, for example, in a case in which the predetermined part is the head and a predetermined object, such as a road cone, is included in the second captured image 50, the determination unit 2020 may determine that the field of view of the second camera 20 is not correct.

The timing when the determination unit 2020 performs the process described in Case 3 is not particularly limited. For example, the determination unit 2020 performs the process whenever the first captured image 40 and the second captured image 50 are acquired. In addition, for example, the determination unit 2020 periodically performs the process. The determination unit 2020 may be configured so as to perform the determination process, using a combination of the above-mentioned various determination methods.

According to the determination method in Case 3, similarly to the determination method in Case 2, a change in the field of view of the second camera 20 can be allowed in the range in which, for example, guarding is not affected. As a result, the convenience of the second camera 20 is improved.
<Details of Notification Unit 2040>

The notification unit 2040 notifies the user 30 that the field of view of the second camera 20 is not correct (S110). Here, information notified to the user 30 is referred to as notification information. The notification information is data of an arbitrary format, such as text data, image data, or voice data. The notification unit 2040 displays the notification information or outputs the notification information as a voice. Then, the user 30 can recognize that the field of view of the second camera 20 is not correct.

Figure 10:
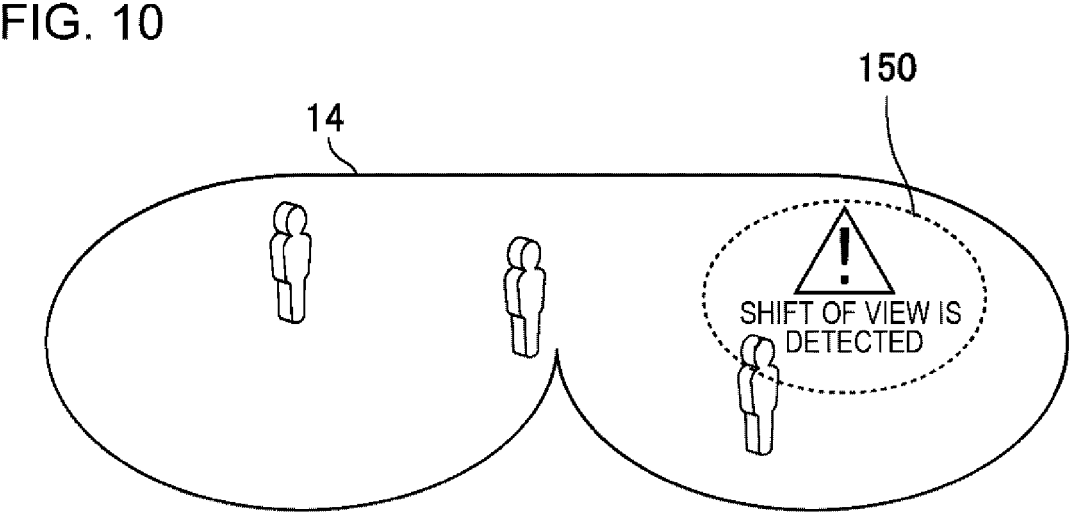
FIG. 10 is a diagram illustrating notification information displayed on a display device.

For example, the notification unit 2040 displays the notification information indicating that the field of view of the second camera 20 is not correct on the display device 14 of the head-mounted display 10. FIG. 10 is a diagram illustrating the notification information displayed on the display device 14. In FIG. 10, notification information 150 is displayed on the display device 14. The user 30 that wears the head-mounted display 10 can see the notification information 150 to recognize that the field of view of the second camera 20 is not correct.

Example Embodiment 2

Figure 11:
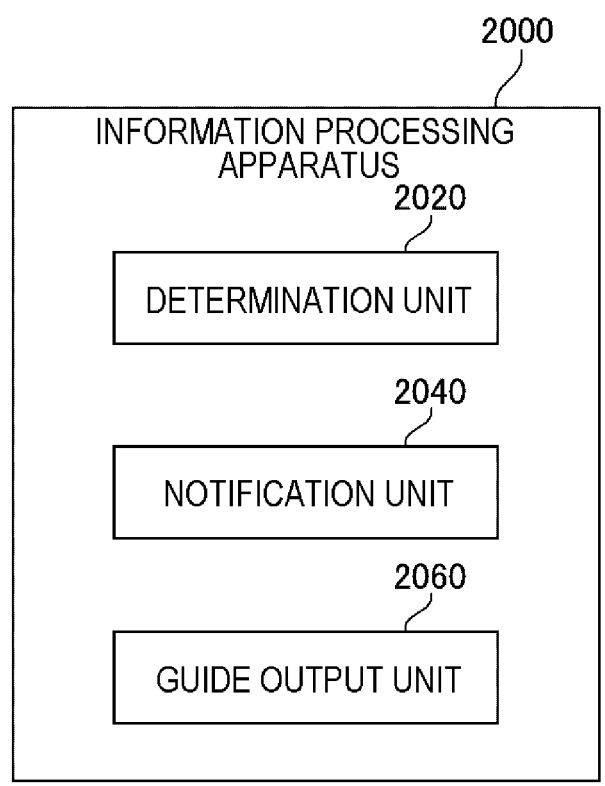
FIG. 11 is a block diagram illustrating an information processing apparatus according to Example Embodiment 2.

FIG. 11 is a block diagram illustrating an information processing apparatus 2000 according to Example Embodiment 2. The information processing apparatus 2000 according to Example Embodiment 2 has the same functions as the information processing apparatus 2000 according to Example Embodiment 1 except the following.

The information processing apparatus 2000 according to Example Embodiment 2 includes a guide output unit 2060. The guide output unit 2060 outputs a guide used to correct the field of view of the second camera 20.
<Flow of Process>

Figure 12:
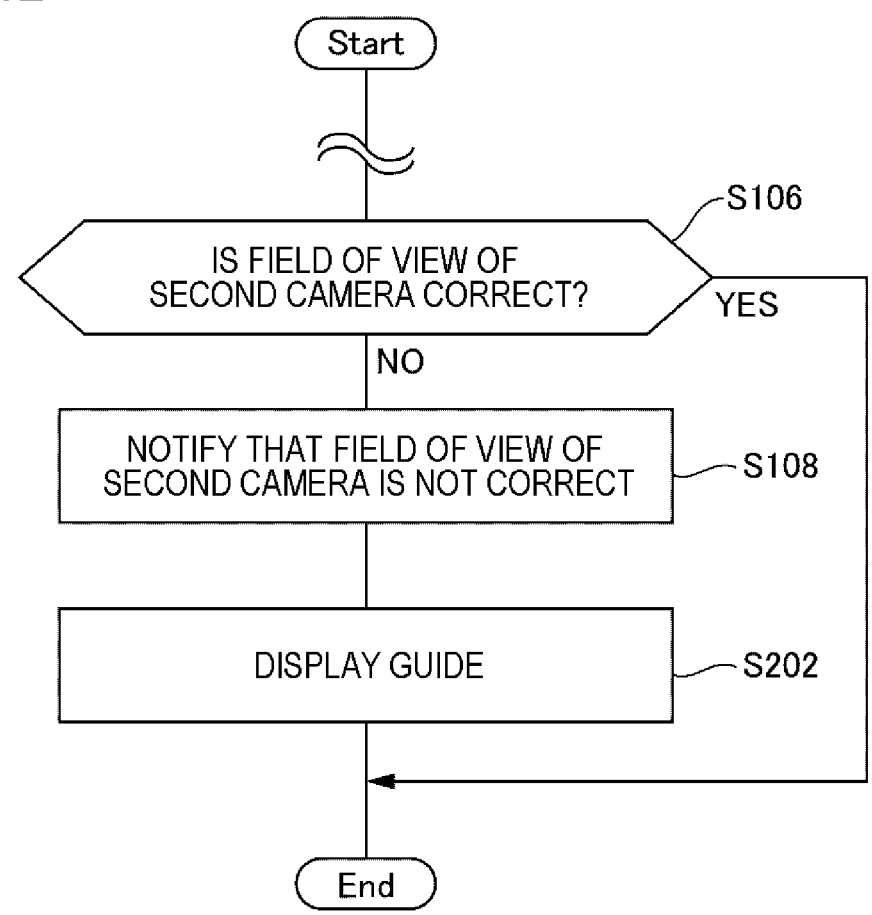
FIG. 12 is a flowchart illustrating the flow of a process performed by the information processing apparatus according to Example Embodiment 2.

FIG. 12 is a flowchart illustrating the flow of a process performed by the information processing apparatus 2000 according to Example Embodiment 2. The information processing apparatus 2000 according to Example Embodiment 2 performs the process from S102 to S108 illustrated in FIG. 4 and then performs S202. Some of the steps illustrated in FIG. 4 are omitted in FIG. 12 for simplicity of illustration.

In S202, the guide output unit 2060 outputs the guide for correcting the field of view of the second camera 20 to be correct.
<Details of Guide Output Unit 2060>

The guide output from the guide output unit 2060 is arbitrary information that can be used to make the field of view of the second camera 20 correct. The guide is data of an arbitrary format, such as text data, image data, or voice data. The guide output unit 2060 displays the guide on the display or outputs the guide as a voice. The user 30 can adjust the position or the angle of view of the second camera 20 or can correct the field of view of the second camera 20 according to the guide.

Figure 13A:
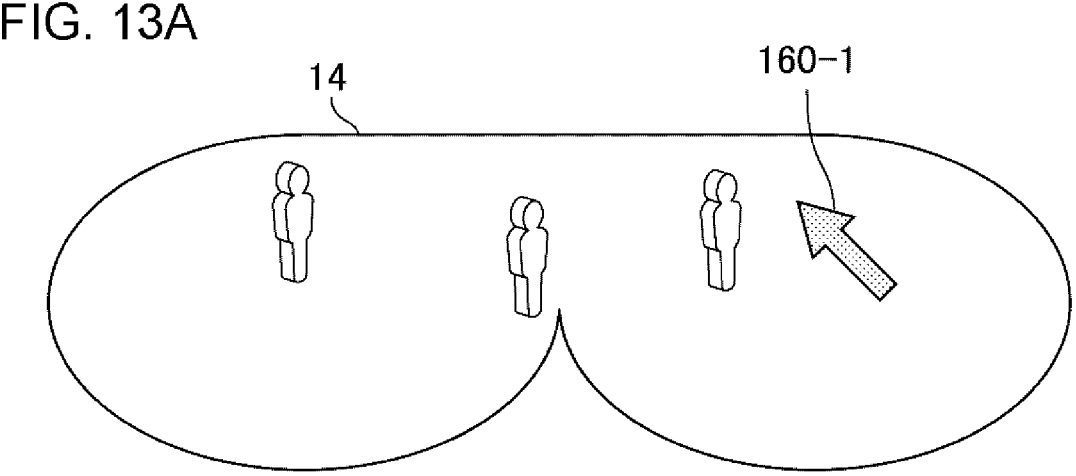
FIGS. 13A-13C are diagrams illustrating a guide displayed on the display device.
Figure 13B:
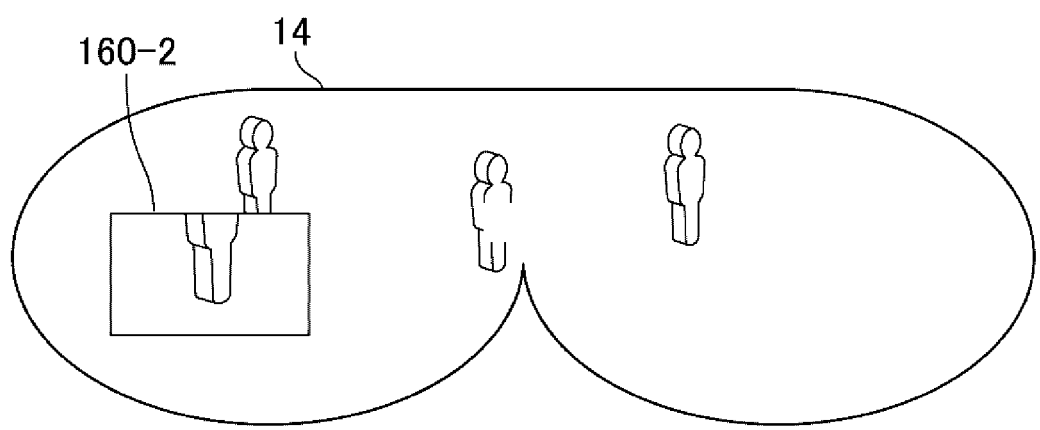
Figure 13C:
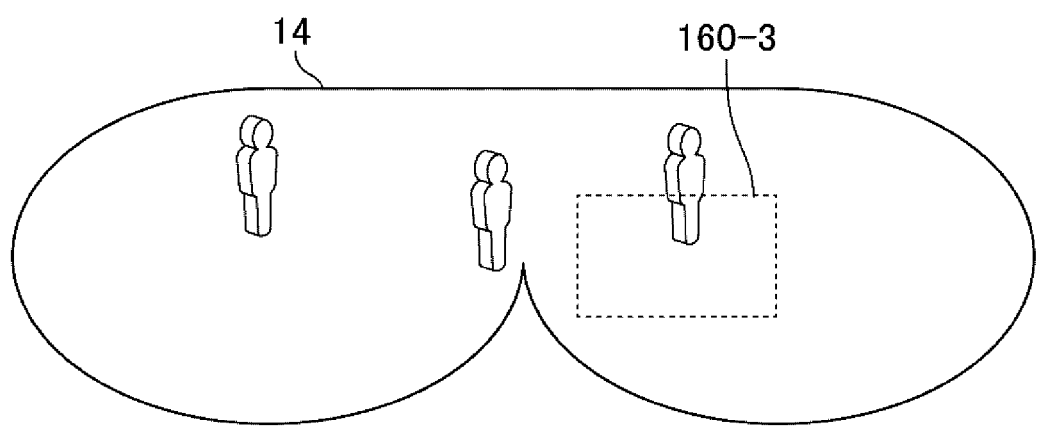

For example, the guide output unit 2060 displays the guide for correcting the field of view of the second camera 20 on the display device 14 of the head-mounted display 10. FIGS. 13A-13C are diagrams illustrating the guide displayed on the display device 14.
<<Example 1 of Guide>>

A guide 160-1 illustrated in FIG. 13A indicates the direction in which the second camera 20 is to be oriented. The user 30 that sees the guide 160-1 changes the attachment position of the second camera 20 or changes the angle of view of the second camera 20 to correct the field of view of the second camera 20 until the guide 160-1 is not displayed. In this way, the user 30 can correct the field of view of the second camera 20 to a correct field of view.

Next, a method for calculating the direction in which the second camera 20 is to be oriented will be described. It is assumed that the relationship information indicates the predetermined range 110 in the field of view of the first camera 12 to be matched with the field of view of the second camera 20 as illustrated in FIG. 5. In this case, for example, the guide output unit 2060 calculates the direction which starts from the center of a region of the first captured image 40 matched with the scenery in the second captured image 50 and ends at the center of the predetermined range 100. Then, the guide output unit 2060 displays an image of an arrow indicating the direction at an arbitrary position on the display device 14.

It is assumed that the relationship information indicates the predetermined range 110 indicating the condition of the field of view of the second camera 20 for the vertical direction as illustrated in FIG. 6. In this case, when the region of the first captured image 40 matched with the scenery in the second captured image 50 is located below the predetermined range 110, the guide output unit 2060 sets the direction in which the second camera 20 is to be oriented to an upward direction. In contrast, when the region of the first captured image 40 matched with the scenery in the second captured image 50 is located above the predetermined range 110, the guide output unit 2060 sets the direction in which the second camera 20 is to be oriented to a downward direction.

Note that, the direction in which the field of view of the second camera 20 is to be oriented may be calculated on the basis of a value measured by a sensor that detects an inclination, such as a gyro sensor. In this case, the information processing apparatus 2000 periodically measures the inclination of the second camera 20, using the sensor, and stores the measurement results in the storage device. Then, the guide output unit 2060 calculates a difference between the inclination of the second camera 20 when the field of view is correct and the current inclination of the second camera 20 by using the inclination of the second camera 20 which has been measured at each point of time for the period from the time when the field of view of the second camera 20 is correct (for example, the time when the second camera 20 starts to be used) to the present time. Then, the guide output unit 2060 sets the direction in which the current inclination of the second camera 20 returns to the inclination of the second camera 20 when the field of view is correct as the direction in which the field of view of the second camera 20 is to be oriented. The above-mentioned sensor is provided in the second camera 20.

Alternatively, the information processing apparatus 2000 may analyze the image captured by the second camera 20 in time series to calculate the inclination direction of the camera. For example, the information processing apparatus 2000 calculates an optical flow between frames of the video generated by the second camera 20 and recognizes the movement direction of entire frames. Then, the information processing apparatus 2000 sets the direction in which the movement of all of the frames returns to the original position as the direction in which the field of view of the second camera 20 is to be oriented.

<<Example 2 of Guide>>

In FIG. 13B, a guide 160-2 displayed on the display device 14 is the scenery (second captured image 50) that is currently included in the field of view of the second camera 20. The user 30 can see the guide 160-2 and know what scenery is currently included in the field of view of the second camera 20.

For example, as described above, it is assumed that the second camera 20 is used to capture an enlarged view of the head of a person. In contrast, in FIG. 13A, the feet of the person are included in the guide 160-2 displayed on the display device 14. Therefore, the field of view of the second camera 20 needs to be oriented upward. For this reason, the user 30 moves up the attachment position of the second camera 20 or adjusts the angle of view of the second camera 20 such that the second camera 20 is inclined upward until the head of the person is displayed in 160-2. In this way, the user 30 can correct the field of view of the second camera 20 to a correct field of view.

<<Example 3 of Guide>>

A guide 160-3 illustrated in FIG. 13C is a frame indicating the current field of view of the second camera 20. The user 30 that sees the guide 160-2 can recognize that the current field of view of the second camera 20 corresponds to a region surrounded by the guide 160-2 on the display device 14. Then, the user 30 moves the attachment position of the second camera 20 or changes the angle of view of the second camera 20 until the guide 160-2 indicates the correct field of view of the second camera 20. In this way, the user 30 can correct the field of view of the second camera 20 to a correct field of view.

Note that, the guide output from the guide output unit 2060 is not limited to the frame. For example, the guide output unit 2060 may color the region, instead of surrounding the region with the frame. In addition, for example, the guide output unit 2060 may not just display the guide, but may display the guide such that the guide blinks to call the user's attention.

The guide output unit 2060 compares the first captured image 40 with the second captured image 50 to detect which region of the first captured image 40 includes the scenery matched with the scenery in the second captured image 50. Then, the guide output unit 2060 sets a region which corresponds to the detected region (hereinafter, referred to as a matched region) on the display device 14 as the region (to be represented by a guide 160-3) indicating the field of view of the second camera 20.

Here, a specific method for displaying a region indicating the field of view of the second camera 20 on the display device 14 varies depending on whether the head-mounted display 10 is a transmissive head-mounted display or a non-transmissive head-mounted display. The transmissive head-mounted display is a head-mounted display in which a display device is transparent or translucent. The user of the transmissive head-mounted display can see, for example, the real scenery that is transmitted through the display device and is viewed and an AR image displayed on the display device at the same time to see a scene in which the AR image is superimposed on the real scenery.

In contrast, the non-transmissive head-mounted display is a head-mounted display in which a display device is not transparent. The non-transmissive head-mounted display 10 captures an image of surrounding scenery with the first camera 12, generates the first captured image 40, and displays the first captured image 40 on the display device 14. The user 30 sees the first captured image 40 displayed on the display device 14 to see the surrounding scenery. The non-transmissive head-mounted display 10 displays, for example, an AR image on the display device 14 so as to be superimposed on the first captured image 40. Therefore, the user 30 can see a scene in which, for example, an AR image is superimposed on the real scenery.

It is assumed that the head-mounted display 10 is a transmissive head-mounted display. In this case, the guide output unit 2060 converts a matched region of the first captured image 40 into a region of the display device 14, using the correspondence relationship between a position on the first captured image 40 and a position on the display device 14. Then, the guide output unit 2060 displays information (for example, a frame) indicating the converted region of the display device 14 on the display device 14.

Here, the correspondence relationship between a position on the first captured image 40 and a position on the display device 14 is predetermined on the basis of the relationship between the field of view of the first camera 12 and the display device 14. Specifically, the correspondence relationship is predetermined using a parameter (a position with respect to the display device 14 or the angle of view) indicating the field of view of the first camera 12. Information indicating the correspondence relationship may be set in the guide output unit 2060 in advance or may be stored in a storage region that can be accessed by the guide output unit 2060.

In a case in which the head-mounted display 10 is a non-transmissive head-mounted display, the guide output unit 2060 superimposes, for example, an image of a frame indicating the matched region on the first captured image 40 displayed on the display device 14. Then, a region corresponds to the field of view of the second camera 20 is displayed on the display device 14.

Figure 14A:
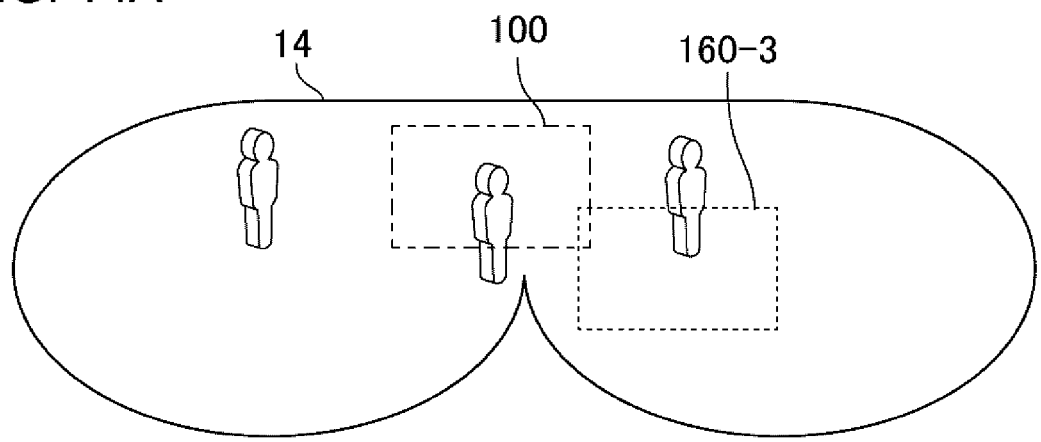
FIGS. 14A and 14B are diagrams illustrating a scene in which a predetermined region or a predetermined range is displayed as a portion of the guide on the display device.
Figure 14B:
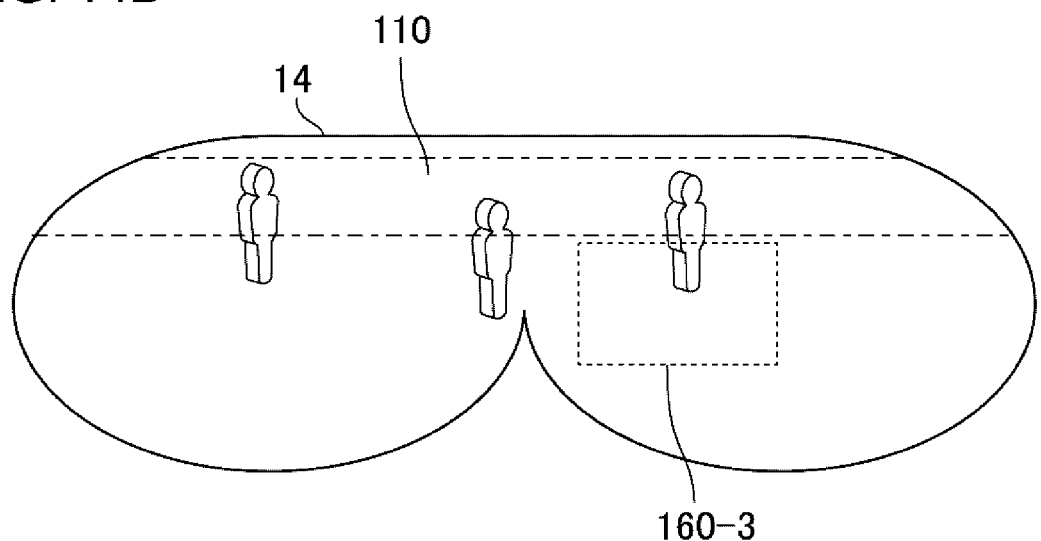

Note that, the guide output unit 2060 may display the predetermined range 100 or the predetermined range 110 indicating the relationship information as a portion of the guide on the display device 14. FIGS. 14A and 14B are diagrams illustrating a scene in which the predetermined range 100 or the predetermined range 110 is displayed as a portion of the guide on the display device 14. In FIG. 14A, the guide 160-3 and the predetermined range 100 are displayed as the guide on the display device 14. The user can correct the field of view of the second camera 20 such that the predetermined range 100 is included in the guide 160-3, thereby adjusting the field of view of the second camera 20 to be correct.

In contrast, in FIG. 14B, the guide 160-3 and the predetermined range 110 are displayed as the guide on the display device 14. The user can correct the field of view of the second camera 20 such that the predetermined range 110 is included in the guide 160-3 in the vertical direction, thereby adjusting the field of view of the second camera 20 to be correct.

Note that, in this example embodiment, the guide output from the guide output unit 2060 may also function as the notification information output from the notification unit 2040. For example, the image of the arrow displayed on the display device 14 in FIG. 13A may function as a guide for correcting the field of view of the second camera 20 to a correct field of view and may also function as notification information for notifying the user 30 that the field of view of the second camera 20 is not correct. In this case, the information processing apparatus 2000 does not need to output the notification information separately from the guide. In this case, the information processing apparatus 2000 may not include the notification unit 2040.

<Example of Hardware Configuration>

The information processing apparatus 2000 according to Example Embodiment 2 has, for example, the hardware configuration illustrated in FIG. 3 which is the same as that of the information processing apparatus 2000 according to Example Embodiment 1. The storage 1080 according to Example Embodiment 2 stores a program for implementing each of the above-mentioned functions according to Example Embodiment 2.

Advantageous Effect

According to this example embodiment, information indicating that the field of view of the second camera 20 is not correct is notified and the guide for correcting the field of view of the second camera 20 is output. The use of the guide makes it possible for the user 30 to easily correct the field of view of the second camera 20.

The example embodiments of the invention have been described above with reference to the drawings. However, the example embodiments are illustrative examples of the invention. The example embodiments may be combined with each other or various configurations other than the above may be used.

Figure 15:
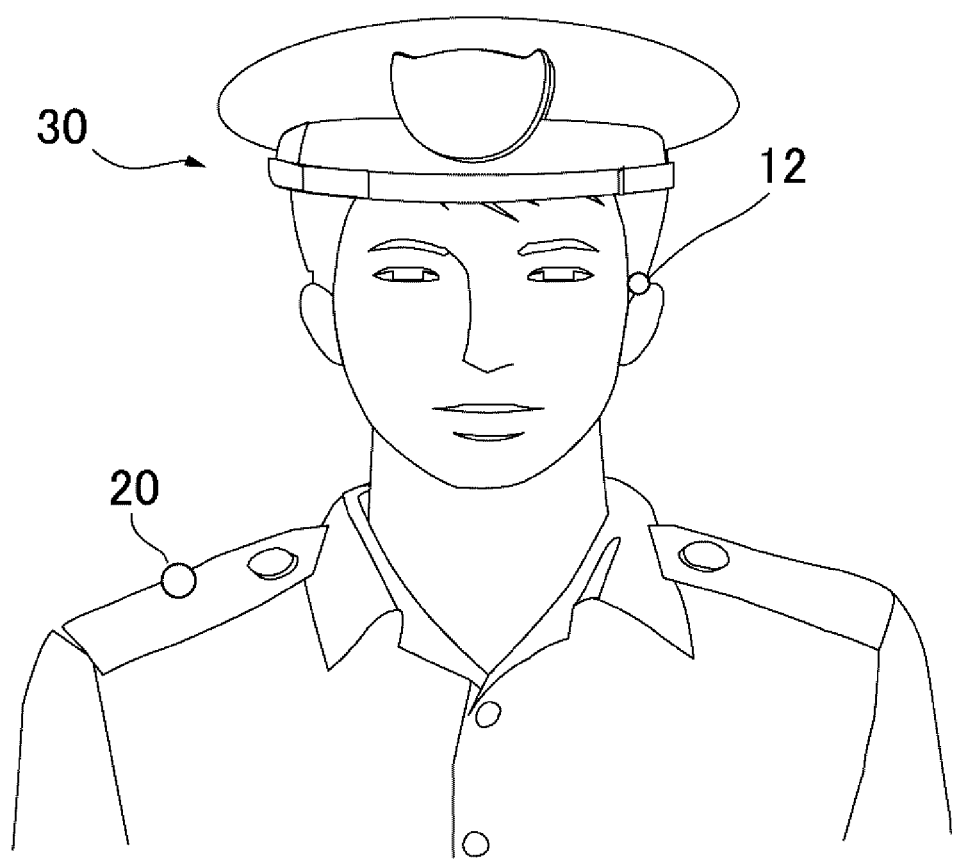
FIG. 15 is a diagram illustrating a case in which a first camera is provided in a part other than the head-mounted display.

For example, the first camera 12 is not necessarily provided in the head-mounted display 10. FIG. 15 is a diagram illustrating a case in which the first camera 12 is provided in a place other than the head-mounted display 10. In FIG. 15, the first camera 12 is fixed in the vicinity of the left ear of the user 30. In addition, the first camera 12 may be fixed to, for example, a hat or general glasses worn by the user 30.

Note that, it is preferable that the first camera 12 is fixed to the head (a part above the neck) of the user 30 such that the scenery in the first captured image 40 is close to the scenery in the field of view of the user 30. However, the position where the first camera 12 is provided is not limited to the head of the user 30.

In a case in which the first camera 12 is not provided in the head-mounted display 10, the user 30 may not wear the head-mounted display 10. In a case in which the user 30 does not wear the head-mounted display 10, for example, the notification information generated by the notification unit 2040 or the guide generated by the guide output unit 2060 is output as a voice. For example, the notification information or the guide may be transmitted as text information or an image to a portable terminal of the user 30. The user 30 can see the text information or the image displayed on a display device of the portable terminal to recognize that the field of view of the second camera 20 is not correct or to see the guide for correcting the field of view of the second camera 20.

In addition, the user 30 may wear a contact lens including a display device, instead of the head-mounted display 10. In this case, the information processing apparatus 2000 can treat the display device provided in the contact lens, similarly to the display device 14 of the head-mounted display 10. In this case, the first camera 12 may be incorporated into the contact lens.

Next, an example of a reference example embodiment will be additionally described.

1. An information processing apparatus includes: a determination unit that determines whether a field of view of a second camera worn by a person is correct, on the basis of a first captured image which is generated by a first camera worn by the person, a second captured image generated by the second camera, and relationship information indicating a predetermined relationship to be satisfied between a field of view of the first camera and the field of view of the second camera; and a notification unit that, in a case in which the field of view of the second camera is determined to be incorrect, notifies that the field of view of the second camera is incorrect. The first camera is provided in a head-mounted display worn by the person and the second camera is provided in a part other than the head-mounted display.

2. In the information processing apparatus according to 1., the relationship information indicates a relationship in which a predetermined range of the field of view of the first camera is included in the field of view of the second camera. The determination unit determines whether the predetermined range of the field of view of the first camera is included in the field of view of the second camera, on the basis of the first captured image, the second captured image, and the relationship information. In a case in which the predetermined range of the field of view of the first camera is not included in the field of view of the second camera, the determination unit determines that the field of view of the second camera is incorrect.

3. In the information processing apparatus according to 2., the predetermined range of the field of view of the first camera indicates a range of the field of view of the first camera in a vertical direction or a horizontal direction.

4. In the information processing apparatus according to 1., in a case in which a person is included in the predetermined range of the field of view of the first camera, the relationship information indicates a relationship in which a predetermined part of the person is included in the field of view of the second camera. The determination unit determines whether the person is included in the predetermined range of the field of view of the first camera, on the basis of the first captured image and the relationship information. In a case in which the person is included in the predetermined range of the field of view of the first camera, the determination unit determines whether the predetermined part of the person is included in the field of view of the second camera, on the basis of the second captured image and the relationship information. In a case in which the predetermined part of the person is not included in the field of view of the second camera, the determination unit determines that the field of view of the second camera is incorrect.

5. The information processing apparatus according to any one of 1. to 4. further includes a guide output unit that outputs a guide for correcting the field of view of the second camera in a case in which the field of view of the second camera is determined to be incorrect.

6. In the information processing apparatus according to 5., the guide indicates a direction in which the field of view of the second camera is to be oriented.

7. In the information processing apparatus according to 5., the guide indicates the second captured image.

8. In the information processing apparatus according to 5., the guide is superimposed on the field of view of the first camera and indicates a current field of view of the second camera.

9. In the information processing apparatus according to 5. to 8., the guide output unit displays the guide on a display device provided in the head-mounted display.

10. A control method that is performed by a computer includes: a determination step of determining whether a field of view of a second camera worn by a person is correct, on the basis of a first captured image generated by a first camera worn by the person, a second captured image generated by the second camera, and relationship information indicating a predetermined relationship to be satisfied between a field of view of the first camera and the field of view of the second camera; and a notification step of, in a case in which the field of view of the second camera is determined to be incorrect, notifying that the field of view of the second camera is incorrect. The first camera is provided in a head-mounted display worn by the person and the second camera is provided in a part other than the head-mounted display.

11. In the control method according to 10., the relationship information indicates a relationship in which a predetermined range of the field of view of the first camera is included in the field of view of the second camera. In the determination step, it is determined whether the predetermined range of the field of view of the first camera is included in the field of view of the second camera, on the basis of the first captured image, the second captured image, and the relationship information. In a case in which the predetermined range of the field of view of the first camera is not included in the field of view of the second camera, it is determined that the field of view of the second camera is incorrect.

12. In the control method according to 11., the predetermined range of the field of view of the first camera indicates a range of the field of view of the first camera in a vertical direction or a horizontal direction.

13. In the control method according to 10., in a case in which a person is included in the predetermined range of the field of view of the first camera, the relationship information indicates a relationship in which a predetermined part of the person is included in the field of view of the second camera. In the determination step, it is determined whether the person is included in the predetermined range of the field of view of the first camera, on the basis of the first captured image and the relationship information. In a case in which the person is included in the predetermined range of the field of view of the first camera, it is determined whether the predetermined part of the person is included in the field of view of the second camera, on the basis of the second captured image and the relationship information. In a case in which the predetermined part of the person is not included in the field of view of the second camera, it is determined that the field of view of the second camera is incorrect.

14. The control method according to any one of 10. to 13. further includes a guide output step of outputting a guide for correcting the field of view of the second camera in a case in which the field of view of the second camera is determined to be incorrect.

15. In the control method according to 14., the guide indicates a direction in which the field of view of the second camera is to be oriented.

16. In the control method according to 14., the guide indicates the second captured image.

17. In the control method according to 14., the guide is superimposed on the field of view of the first camera and indicates a current field of view of the second camera.

18. In the control method according to any one of 14. to 17., in the guide output step, the guide is displayed on a display device provided in the head-mounted display.

19. A program causes a computer to perform each step of the control method according to any one of 10. to 18.

20. A head-mounted display includes: a first camera that performs imaging to generate a first captured image; a determination unit that determines whether a field of view of a second camera worn by a person that wears the head-mounted display is correct, on the basis of the first captured image, a second captured image generated by the second camera, and relationship information indicating a predetermined relationship to be satisfied between a field of view of the first camera and the field of view of the second camera; and a notification unit that, in a case in which the field of view of the second camera is determined to be incorrect, notifies that the field of view of the second camera is incorrect. The second camera is provided in a part other than the head-mounted display.

21. A body-worn camera that is worn by a person includes: a determination unit that determines whether a field of view of the body-worn camera is correct, on the basis of a first captured image which is generated by a camera provided in a head-mounted display worn by the person, a second captured image generated by the body-worn camera, and relationship information indicating a predetermined relationship to be satisfied between a field of view of the camera provided in the head-mounted display and the field of view of the body-worn camera; and a notification unit that, in a case in which the field of view of the body-worn camera is determined to be incorrect, notifies that the field of view of the body-worn camera is incorrect. The body-worn camera is provided in a part other than the head-mounted display.

This application claims priority from Japanese Patent Application No. 2015-255924 filed Dec. 28, 2015, the content of which is incorporated herein by reference in its entirety.

The invention claimed is:

1. An information processing apparatus comprising at least one processor configured to:
   determine whether a field of view of a second camera worn by a person is correct, on the basis of a first captured image which is generated by a first camera worn by the person, a second captured image generated by the second camera, and relationship information indicating a predetermined relationship to be satisfied between a field of view of the first camera and the field of view of the second camera; and
   in a case in which the field of view of the second camera is determined to be incorrect, notify that the field of view of the second camera is incorrect,
   wherein the first camera is provided in a head-mounted display worn by the person, and
   the second camera is provided in a part other than the head-mounted display.

2. The information processing apparatus according to claim 1,
   wherein the relationship information indicates a relationship in which a predetermined range of the field of view of the first camera is included in the field of view of the second camera,
   the processor is further configured to determine whether the predetermined range of the field of view of the first camera is included in the field of view of the second camera, on the basis of the first captured image, the second captured image, and the relationship information; and
   the processor is further configured to, in a case in which the predetermined range of the field of view of the first camera is not included in the field of view of the second camera, determine that the field of view of the second camera is incorrect.

3. The information processing apparatus according to claim 2,
wherein the predetermined range of the field of view of the first camera indicates a range of the field of view of the first camera in a vertical direction or a horizontal direction.

4. The information processing apparatus according to claim 1,
wherein, in a case in which a person is included in the predetermined range of the field of view of the first camera, the relationship information indicates a relationship in which a predetermined part of the person is included in the field of view of the second camera,
the processor is further configured to determine whether the person is included in the predetermined range of the field of view of the first camera, on the basis of the first captured image and the relationship information,
the processor is further configured to, in a case in which the person is included in the predetermined range of the field of view of the first camera, determine whether the predetermined part of the person is included in the field of view of the second camera, on the basis of the second captured image and the relationship information, and
the processor is further configured to in a case in which the predetermined part of the person is not included in the field of view of the second camera, determine that the field of view of the second camera is incorrect.

5. The information processing apparatus according to claim 1, wherein the processor is further configured to:
output a guide for correcting the field of view of the second camera in a case in which the field of view of the second camera is determined to be incorrect.

6. The information processing apparatus according to claim 5,
wherein the guide indicates a direction in which the field of view of the second camera is to be oriented.

7. The information processing apparatus according to claim 5,
wherein the guide indicates the second captured image.

8. The information processing apparatus according to claim 5,
wherein the guide is superimposed on the field of view of the first camera and indicates a current field of view of the second camera.

9. The information processing apparatus according to claim 5,
wherein the guide output unit displays the guide on a display device provided in the head-mounted display.

10. A control method that is performed by a computer, comprising:

determining whether a field of view of a second camera worn by a person is correct, on the basis of a first captured image which is generated by a first camera worn by the person, a second captured image generated by the second camera, and relationship information indicating a predetermined relationship to be satisfied between a field of view of the first camera and the field of view of the second camera; and
in a case in which the field of view of the second camera is determined to be incorrect, notifying that the field of view of the second camera is incorrect,
wherein the first camera is provided in a head-mounted display worn by the person, and
the second camera is provided in a part other than the head-mounted display.

11. A non-transitory computer-readable storage medium storing a program that causes a computer to perform each step of the control method according to claim 10.

12. A head-mounted display comprising:
a first camera that captures an image to generate a first captured image; and at least one processor configure to:
determine whether a field of view of a second camera worn by a person that wears the head-mounted display is correct, on the basis of the first captured image, a second captured image generated by the second camera, and relationship information indicating a predetermined relationship to be satisfied between a field of view of the first camera and the field of view of the second camera; and
in a case in which the field of view of the second camera is determined to be incorrect, notify that the field of view of the second camera is incorrect,
wherein the second camera is provided in a part other than the head-mounted display.

13. A body-worn camera that is worn by a person, comprising at least one processor configured to:
determine whether a field of view of the body-worn camera is correct, on the basis of a first captured image which is generated by a camera provided in a head-mounted display worn by the person, a second captured image generated by the body-worn camera, and relationship information indicating a predetermined relationship to be satisfied between a field of view of the camera provided in the head-mounted display and the field of view of the body-worn camera; and
in a case in which the field of view of the body-worn camera is determined to be incorrect, notify that the field of view of the body-worn camera is incorrect,
wherein the body-worn camera is provided in a part other than the head-mounted display.

* * * * *